US012096145B2

United States Patent
Price et al.

(10) Patent No.: US 12,096,145 B2
(45) Date of Patent: *Sep. 17, 2024

(54) SYSTEMS AND METHODS FOR STRUCTURED LIGHT DEPTH COMPUTATION USING SINGLE PHOTON AVALANCHE DIODES

(71) Applicant: Microsoft Technology Licensing, LLC, Redmond, WA (US)

(72) Inventors: Raymond Kirk Price, Carnation, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,201

(22) Filed: Apr. 12, 2023

(65) Prior Publication Data

US 2023/0254603 A1  Aug. 10, 2023

Related U.S. Application Data

(63) Continuation of application No. 17/306,747, filed on May 3, 2021, now Pat. No. 11,659,296.

(51) Int. Cl.
*H04N 25/705* (2023.01)
*G02B 27/01* (2006.01)

(52) U.S. Cl.
CPC ....... *H04N 25/705* (2023.01); *G02B 27/0172* (2013.01); *G02B 2027/0138* (2013.01)

(58) Field of Classification Search
CPC ............ H04N 5/36965; G02B 27/0172; G02B 2027/0138
USPC ..................................................... 348/207.99
See application file for complete search history.

(56) References Cited

U.S. PATENT DOCUMENTS

| | | | |
|---|---|---|---|
| 11,587,247 B1* | 2/2023 | Ronchini Ximenes | H04N 13/128 |
| 2019/0174120 A1* | 6/2019 | Wang | H04N 25/702 |
| 2019/0293796 A1* | 9/2019 | Hall | G06T 7/50 |
| 2020/0319344 A1* | 10/2020 | Ronchini Ximenes | G06T 7/50 |
| 2021/0026011 A1* | 1/2021 | Kostamovaara | G01S 17/89 |
| 2021/0325541 A1* | 10/2021 | Kim | H04N 13/156 |
| 2021/0352234 A1* | 11/2021 | Padmanabhan | H04N 25/75 |

\* cited by examiner

*Primary Examiner* — Lin Ye
*Assistant Examiner* — Chan T Nguyen
(74) *Attorney, Agent, or Firm* — Workman Nydegger

(57) ABSTRACT

A system for structured light depth computation using single photon avalanche diodes (SPADs) is configurable to, over a frame capture time period, selectively activate the illuminator to perform interleaved structured light illumination operations. The interleaved structured light illumination operations comprise alternately emitting at least a first structured light pattern from the illuminator and emitting at least a second structured light pattern from the illuminator. The system is also configurable to, over the frame capture time period, perform a plurality of sequential shutter operations to configure each SPAD pixel of the SPAD array to enable photon detection. The plurality of sequential shutter operations generates, for each SPAD pixel of the SPAD array, a plurality of binary counts indicating whether a photon was detected during each of the plurality of sequential shutter operations.

20 Claims, 16 Drawing Sheets

SYSTEMS AND METHODS FOR STRUCTURED LIGHT DEPTH COMPUTATION USING SINGLE PHOTON AVALANCHE DIODES

CROSS-REFERENCE TO RELATED APPLICATIONS

This application is a continuation of U.S. patent application Ser. No. 17/306,747, filed on May 3, 2021, and entitled "SYSTEMS AND METHODS FOR STRUCTURED LIGHT DEPTH COMPUTATION USING SINGLE PHOTON AVALANCHE DIODES", the entirety of which is incorporated herein by reference.

BACKGROUND

Depth maps include information indicating distances between a viewpoint (e.g., a viewpoint of a camera capturing an image of an environment) and surfaces of objects within a scene (e.g., objects within the environment captured by the camera). Depth maps are used as a tool to facilitate various computer vision tasks and/or user experiences, such as simultaneous localization and mapping, object tracking, passthrough imaging (e.g., capturing images and using a depth map to reproject them to correspond to another perspective), photogrammetry, surface reconstruction, and/or others.

Depth maps can be generated in various ways. One example technique for generating a depth map includes structured light depth imaging. One form of structured light depth imaging includes projecting a series of different light patterns (e.g., striped patterns with different numbers and/or widths of stripes) into an environment and utilizing a camera to capture a series of images of the environment. Each image captures the environment while the environment is illuminated with a different light pattern.

While capturing the images, the camera is typically kept stationary so that each image sensing pixel of the camera captures the same portion of the environment throughout the projecting and capturing of the different light patterns.

The light patterns of the series of different light patterns are selected to allow pixel signatures to be determined for each image sensing pixels of the camera. For example, the series of different light patterns may include arrangements of vertical stripes formed from illuminated vertical sections and unilluminated vertical sections arranged in an alternating pattern. The different light patterns may include different densities of vertical stripes. For instance, a first light pattern may include a single illuminated vertical section (occupying half of the pattern) and a single unilluminated vertical section (occupying the other half of the pattern). A second light pattern may include four vertical stripes (two illuminated, two unilluminated, arranged in an alternating pattern), a third light pattern may include eight vertical stripes (four illuminated, four unilluminated, arranged in an alternating pattern), and so forth.

According to the above example, a pixel signature for a particular image sensing pixel may be defined by tracking whether the portion of the environment captured by the particular image sensing pixel was illuminated during projection of each of the different light patterns into the environment. For instance, a first value may be recorded indicating whether the particular image sensing pixel detected light pattern illumination while the first light pattern was projected into the environment (e.g., a binary "1" or "0", with a "1" indicating that illumination was detected), a second value may be recorded indicating whether the particular image sensing pixel detected light pattern illumination while the second light pattern was projected into the environment, a third value may be recorded indicating whether the particular image sensing pixel detected light pattern illumination while the third light pattern was projected into the environment, and so forth. Stated differently, the first value may indicate whether the portion of the environment captured by the particular image sensing pixel was within an illuminated stripe of the first pattern, the second value may indicate whether the portion of the environment captured by the particular image sensing pixel was within an illuminated stripe of the second pattern, the third value may indicate whether the portion of the environment captured by the particular image sensing pixel was within an illuminated stripe of the third pattern, and so forth. The various values for the particular image sensing pixel (e.g., indicating light pattern illumination or non-illumination during projection of the series of different light patterns) may be combined (e.g., arranged as a sequence of values) to generate the pixel signature for the particular image sensing pixel.

Pixels signatures as discussed above may be determined for the image sensing pixel of the camera based on images captured of the various structured light patterns projected into the environment. A system may also determine virtual pixel signatures based on the structured light patterns projected into the environment. For example, the virtual pixel signatures may each be associated with pixel coordinates and may be based on whether the pixel coordinates correspond to an illuminated portion or an unilluminated portion across multiple patterns.

Accordingly, to perform depth computations, a system may search along scanlines (e.g., horizontal scanlines, or a scanning direction orthogonal to the stripes of the structured light patterns) to identify the locations of camera pixels associated with pixel signatures that match a virtual pixel signature on the same scanline. The system may use pixel coordinates associated with matched pixel signatures and virtual pixel signatures to determine disparity and/or depth values. Such matching may be performed or attempted to calculate depth values for all camera pixels, thereby forming a depth map of the captured environment. To facilitate ideal structured light depth imaging as discussed above, the light patterns of the series of structured light patterns should be selected to allow pixel signatures for each image sensing pixel of the camera to be unique from other pixel signatures at least along the same scanline (e.g., along the same horizontal scanline).

In some instances, structured light imaging as described in the above example may provide high-precision depth information for a captured environment with reduced error compared to other conventional techniques for depth imaging (e.g., using a single dot pattern projection to facilitate active stereo imaging). However, environments that include moving objects present many challenges for structured light imaging utilizing a series of light patterns as discussed above. For example, structured light images are typically captured using complementary metal-oxide-semiconductor (CMOS) and/or charge-coupled device (CCD) image sensors. Such sensors may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

CMOS and/or CCD image sensors typically operate by performing an exposure operation to allow charge to collect in the per-pixel capacitors and subsequently performing a readout operation to generate image data based on the collected per-pixel charge. Thus, moving objects in a captured environment often occupy one position (or one set of positions) during exposure and/or readout of a first light pattern image and occupy a different position (or different set of positions) during exposure and/or readout of a second light pattern image. Thus, different light pattern images may include spatially misaligned representations of the same objects in the environment, which can cause errors in depth computations.

Thus, for at least the foregoing reasons, there is an ongoing need and desire for improved systems and methods for facilitating structured light depth computations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for facilitating structured light depth computation using single photon avalanche diodes (SPADs).

Some embodiments provide a system that includes a SPAD array comprising a plurality of SPAD pixels, an illuminator configured to emit one or more structured light patterns, one or more processors, and one or more hardware storage devices storing instructions that are executable by the one or more processors to configure the system to perform various acts. The acts include, over a frame capture time period, selectively activating the illuminator to perform interleaved structured light illumination operations. The interleaved structured light illumination operations include alternately emitting at least a first structured light pattern from the illuminator and emitting at least a second structured light pattern from the illuminator. The acts also include, over the frame capture time period, performing a plurality of sequential shutter operations to configure each SPAD pixel of the SPAD array to enable photon detection. The plurality of sequential shutter operations generates, for each SPAD pixel of the SPAD array, a plurality of binary counts indicating whether a photon was detected during each of the plurality of sequential shutter operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
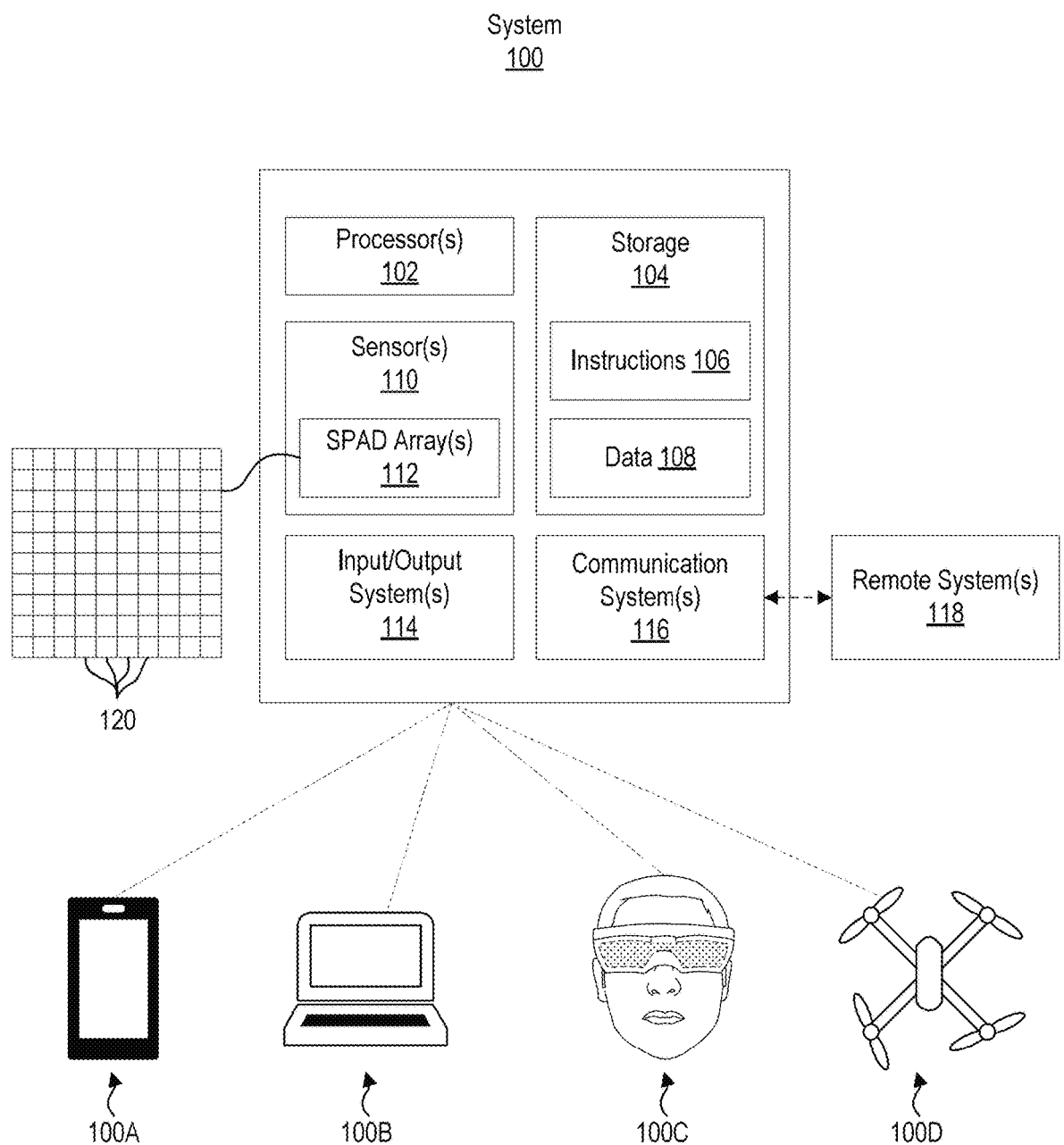
FIG. 1 illustrates example components of an example system that may include or be used to implement one or more disclosed embodiments.

Disclosed embodiments are generally directed to systems, methods, and devices for facilitating structured light depth computation using single photon avalanche diodes (SPADs).

Examples of Technical Benefits, Improvements, and Practical Applications

Those skilled in the art will recognize, in view of the present disclosure, that at least some of the disclosed embodiments may be implemented to address various shortcomings associated with at least some conventional structured light depth computation techniques. The following section outlines some example improvements and/or practical applications provided by the disclosed embodiments. It will be appreciated, however, that the following are examples only and that the embodiments described herein are in no way limited to the example improvements discussed herein.

In contrast with conventional CMOS or CCD sensors, a SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be integrated over a frame capture time period. The binary output of the shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of multiple shutter operations over a frame capture time period may be counted, and per-pixel intensity values may be calculated based on the counted per-pixel binary output. The per-pixel intensity values may be used to form an intensity image of an environment.

As will be described in more detail hereinafter, techniques of the present disclosure include performing interleaved light pattern exposure operations using SPAD pixels of a SPAD array. During a first light pattern exposure, sequential shutter operations are performed using the SPAD pixels to generate binary counts, with each binary count indicating whether a photon was detected during a shutter operation (e.g., "1" indicating a photon was detected, "0" indicating that no photon was detected). The sequential shutter operations of the first light pattern exposure are performed as the captured scene is illuminated according to a first light pattern. During a second light pattern exposure, sequential shutter operations are performed using the SPAD pixels while an illuminator emits a second light pattern into the captured scene. These shutter operations also provide binary counts. The different light pattern exposures and corresponding light pattern illuminations may be performed in an interleaved manner (e.g., first light pattern illumination and exposure, second light pattern illumination and exposure, first light pattern illumination and exposure, and so forth). Additional light pattern exposures under illumination according to additional light patterns may also be performed and interleaved (e.g., third light pattern illumination and exposure, fourth light pattern illumination and exposure, nth light pattern illumination and exposure).

The interleaved light pattern exposures are alternately performed (e.g., one after the other) over a frame capture time period, providing multiple subsets of binary counts. For example, a first subset of binary counts may be associated with the first light pattern exposure, a second temporally subsequent subset of binary counts may be associated with a second light pattern exposure, a third temporally subsequent subset of binary counts may be associated with first light pattern exposure, a fourth temporally subsequent subset of binary counts may be associated with second light pattern exposure, a fifth temporally subsequent subset of binary counts may be associated with first light pattern exposure, and so forth. As noted above, additional subsets of binary counts may correspond to additional light pattern illuminations and exposures and may be interleaved with the above.

Accordingly, subsets of binary counts associated with the same light pattern exposures (e.g., different subsets of binary counts associated with a first light pattern exposure) can be generated not temporally contiguous to one another. Furthermore, a subset of binary counts associated with one light pattern exposure (e.g., a second light pattern exposure) may temporally intervene between two subsets of binary counts associated with another light pattern exposure (e.g., a first light pattern exposure), and vice versa.

A system may then use all of the subsets of binary counts associated with each particular light pattern exposure (e.g., the first light pattern exposure, the second light pattern exposure, etc.) to generate a respective light pattern image for the particular light pattern exposure, even where the subsets of binary counts associated with the particular light pattern exposure are temporally noncontiguous. The different respective light pattern images may be used to generate pixel signatures for computing depth information.

The use of SPAD image sensors to capture light pattern images as described herein may provide a number of advantages over conventional systems and techniques for capturing light pattern images (e.g., for structured light depth computations). As noted above, conventional techniques for capturing light pattern images include utilizing CMOS or CCD sensors to fully expose and read out a first light pattern image before proceeding to fully expose and read out a subsequent light pattern image, which may give rise to motion artifacts and/or spatial misalignment between the different light pattern images. In contrast, by interleaving different light pattern exposures according to the present disclosure, the motion in the captured scene (and/or motion of the image sensor(s)) will affect all light pattern images in a similar manner, thereby mitigating motion artifacts and/or spatial misalignment between the light pattern images. Accordingly, the accuracy and/or usability of structured light depth imaging may be improved.

Having just described some of the various high-level features and benefits of the disclosed embodiments, attention will now be directed to FIGS. 1 through 8. These Figures illustrate various conceptual representations, architectures, methods, and supporting illustrations related to the disclosed embodiments.

Example Systems and Techniques for Structured Light Depth Computation Using SPADs FIG. 1 illustrates various example components of a system 100 that may be used to implement one or more disclosed embodiments. For example, FIG. 1 illustrates that a system 100 may include processor(s) 102, storage 104, sensor(s) 110, SPAD array(s) 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 may include SPAD array(s) 112. As depicted in FIG. 1, a SPAD array 112 may comprise an arrangement of SPAD pixels 120 that are each configured to facilitate avalanche events in response to sensing a photon, as described hereinabove. SPAD array(s) 112 may be implemented on a system 100 (e.g., an MR HMD) to facilitate various functions such as image capture and/or computer vision tasks.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. Although the present description focuses, in at least some respects, on utilizing an HMD to implement techniques of the present disclosure, additional or alternative types of systems may be used.

Figure 2:
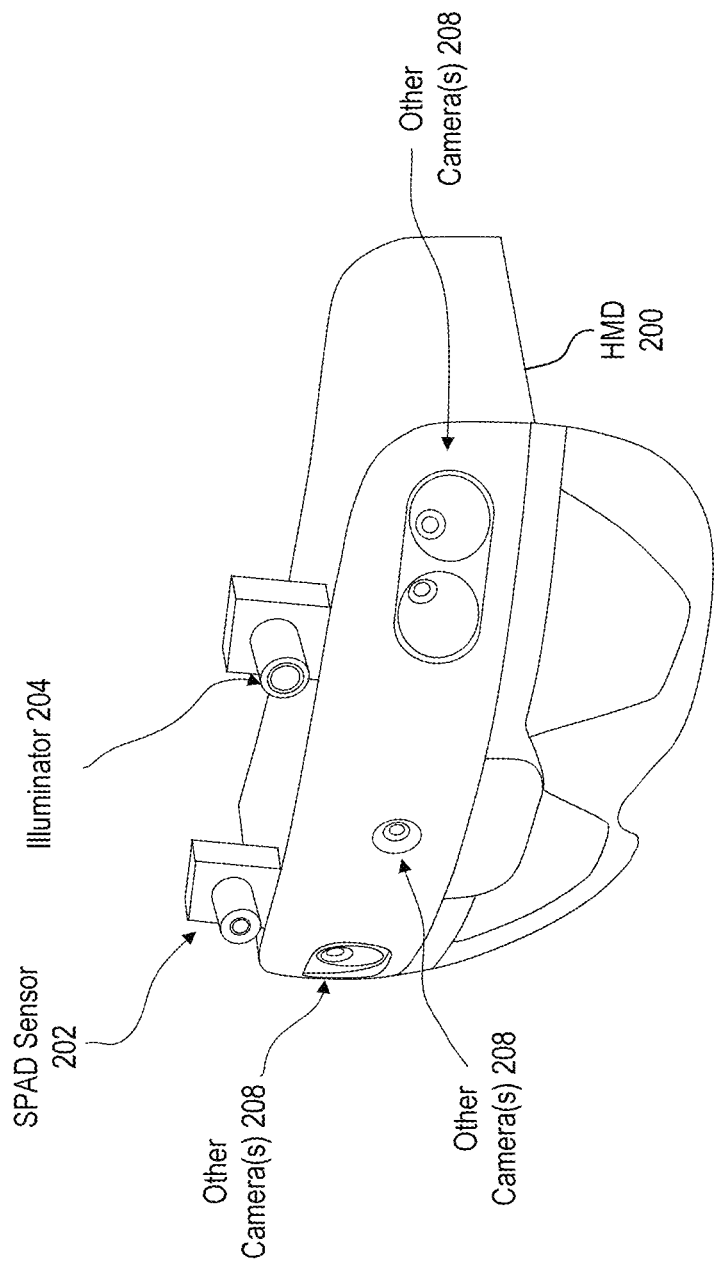
FIG. 2 illustrates an example implementations of single photon avalanche diode (SPAD) sensors in a head-mounted display (HMD)

FIG. 2 illustrates an example implementations of a single photon avalanche diode (SPAD) sensor in a head-mounted display (HMD). In particular, FIG. 2 illustrates an example HMD 200, which may correspond in at least some respects to the system 100 described hereinabove with reference to FIG. 1. In the example shown in FIG. 2, the HMD 200 includes SPAD sensor 202. The SPAD sensor 202 may be configured to capture intensity image frames as described hereinabove (e.g., by counting photons or avalanche events detected over a frame capture time period on a per-pixel basis). Intensity images captured using the SPAD sensor 202 may be used for a variety of purposes, such as to facilitate image/video capture, pass-through imaging, depth computations (e.g., structured light depth imaging), object tracking, object segmentation, surface reconstruction, simultaneous localization and mapping (SLAM), and/or others. The HMD 200 may implement any number of other camera(s) 208 for the same, additional, or alternative purposes.

FIG. 2 also illustrates the HMD 200 as comprising an illuminator 204, which may take the form of any suitable light emitting device. As will be described herein, a system (e.g., an HMD 200 or/or other device) may operate an illuminator (e.g., illuminator 204) in conjunction with one or more SPAD sensors (e.g., SPAD sensor 202) to capture images that are usable to facilitate structured light depth computation. For example, a system may selectively (or iteratively) activate the illuminator (e.g., in a pulsed manner) to allow the SPAD sensor(s) 202A-202E to capture images of an environment as the environment is illuminated with different structured light patterns. The system may utilize the illuminator 204 as a "virtual camera" in conjunction with the SPAD sensor 202 to facilitate structured light depth computations.

In accordance with the present disclosure, the illuminator 204 may take on various forms to facilitate various types of illumination for capturing various types of illuminated images. For example, the illuminator 204 may be configured to emit visible light, infrared light, ultraviolet light, combinations thereof, and/or light in other spectral ranges. In some instances, as indicated above, the illuminator 204 may be configured to emit one or more structured light patterns, such as striped structured light patterns. Although the present disclosure focuses, in at least some respects, emitting striped structured light patterns with an illuminator to facilitate structured light depth computations, one will appreciate, in view of the present disclosure, that additional or alternative types of illumination may be used. For example, grayscale illumination, sinusoidal patterns, random patterns, and/or others may be used.

One will appreciate, in view of the present disclosure, that although FIG. 2 only illustrates a single illuminator 204 on the HMD 200, any number of illuminators may be used with any type(s) of system(s) to practice techniques of the present disclosure.

Figure 3A:
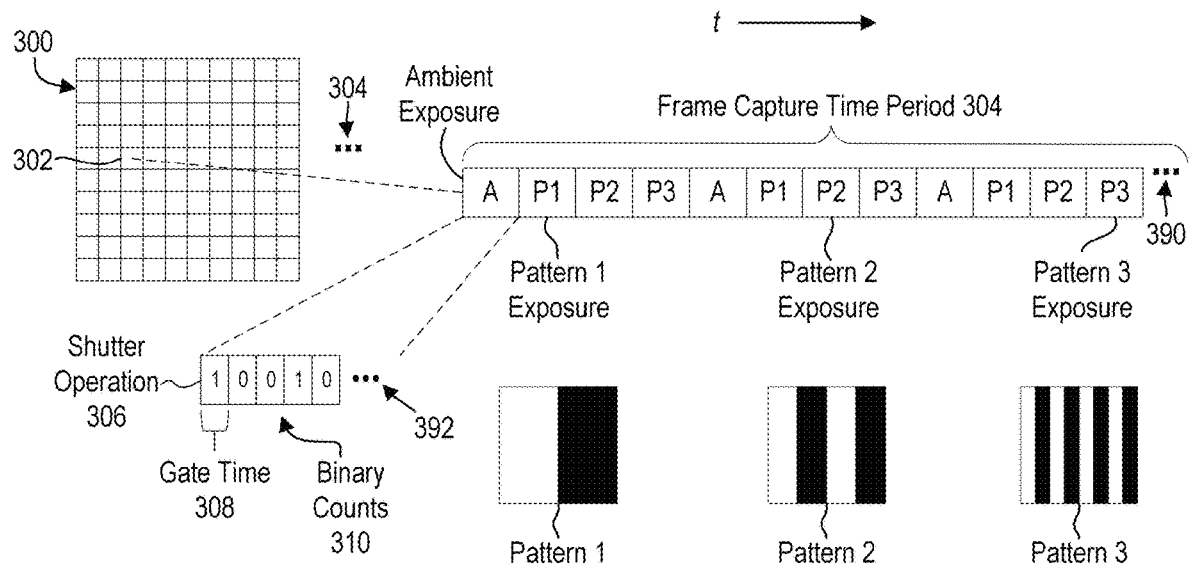
FIGS. 3A-3E illustrate an example of SPAD exposure operations performed over a frame capture time period under illumination by different structured light patterns.

FIGS. 3A-3E illustrate an example of SPAD exposure operations performed over a frame capture time period. In particular, FIG. 3A illustrates a SPAD array 300, which may correspond to the SPAD array(s) 112 described hereinabove with reference to FIG. 1. In this regard, each SPAD pixel (e.g., SPAD pixel 302) of the SPAD array 300 is configurable to trigger avalanche events in response to detecting photons. The SPAD pixel 302 may be operated in a controlled, gated manner to facilitate different exposure operations for image acquisition.

FIG. 3A depicts ellipsis 304 between SPAD pixels of the SPAD array 300 and representations of exposure operations that will be described in more detail hereafter. The ellipsis 340 indicates that the exposure operations described hereafter may be performed using any number of SPAD pixels of a SPAD array 300 (e.g., all SPAD pixels). A single representation of the exposure operations is shown in FIG. 3A (and subsequent Figures) for the sake of clarity and simplicity. FIG. 3A additionally provides a time axis t to illustrate the temporal relationship among the different exposure operations that will be described hereinafter.

FIG. 3A shows that, to facilitate capturing of image frames usable for structured light depth computations, SPAD pixels of a SPAD array 300 are configured to perform multiple exposure operations in an interleaved manner. In particular, FIG. 3A illustrates ambient exposure operations (labeled as "A" in FIG. 3A), pattern 1 exposure operations (labeled as "P1" in FIG. 3A and referred to hereinafter as "P1 exposure operations"), pattern 2 exposure operations (labeled as "P2" in FIG. 3A and referred to hereinafter as "P2 exposure operations"), and pattern 3 exposure operations (labeled as "P3" in FIG. 3A and referred to hereinafter as "P3 exposure operations") performed over a frame capture time period 304. In the example shown in FIG. 3A, the ambient exposure operations, P1 exposure operations, P2 exposure operations, and P3 exposure operations are performed in an interleaved manner, with sets of exposure operations including an ambient exposure operation, a P1 exposure operation, a P2 exposure operation, and a P3 exposure operation being performed one after another.

The ellipsis 390 indicates that any number of ambient exposure operations, P1 exposure operations, P2 exposure operations, and/or P3 exposure operations may be performed over the frame capture time period 304. Furthermore, although the present example focuses, in at least some respects, on utilizing ambient exposure operations, P1 exposure operations, P2 exposure operations, and P3 exposure operations, ambient exposure operations may be omitted from the frame capture time period 304, and/or additional or fewer pattern exposure operations may be interleaved within the frame capture time period 304.

FIG. 3A furthermore illustrates (via dashed lines extending downward from the first ambient exposure operation) that an ambient exposure operation includes applying a set of shutter operations 306. As noted above, applying a shutter operation to a SPAD pixel configures the SPAD pixel for photon detection by configuring the SPAD pixel to trigger avalanche events in response to detected photons. Thus, the presence of an avalanche event during a shutter operation indicates that the SPAD pixel detected a photon during the shutter operation. Whether a SPAD pixel experienced an avalanche event (and therefore detected a photon) during a shutter operation may be represented by a binary "1" or "0", with "1" indicating that an avalanche event occurred during the shutter operation and with "0" indicating that no avalanche event occurred during the shutter operation. Accordingly, FIG. 3A depicts binary counts 310 associated with each shutter operation 306. The ellipsis 392 indicates that an ambient exposure operation may comprise any suitable number of shutter operations 306.

FIG. 3A also depicts that the individual shutter operations 306 are performed over a particular gate time 308. The gate time 308 is the duration over which a SPAD pixel becomes configured to trigger an avalanche event in response to a detected photon.

Although FIG. 3A only explicitly depicts the set of shutter operations 306 associated with the first ambient exposure operation, other sets of shutter operations are applied to facilitate the other exposures (i.e., the P1, P2, and/or P3 exposure operations). For each P1 exposure operation, shutter operations 306 are performed while an illuminator (e.g., illuminator 204) is selectively activated (or pulsed) to project pattern 1 into the environment. As depicted in FIG. 3A, pattern 1 includes an illuminated vertical stripe (on the left, illustrated in white) and an unilluminated vertical stripe (on the right, illustrated in black). For each P2 exposure operation, shutter operations 306 are performed while an illuminator (e.g., illuminator 204) is selectively activated (or pulsed) to project pattern 2 into the environment. As depicted in FIG. 3A, pattern 2 includes two illuminated vertical stripes and two unilluminated vertical stripes, which are arranged in an alternating fashion. Furthermore, for each P3 exposure operation, shutter operations 306 are performed while an illuminator (e.g., illuminator 204) is selectively activated (or pulsed) to project pattern 3 into the environment. As depicted in FIG. 3A, pattern 3 includes four illuminated vertical stripes and four unilluminated vertical stripes, which are arranged in an alternating fashion. In contrast, for each ambient exposure operation, shutter operations 306 are performed while the illuminator(s) selectively refrain(s) from illuminating the environment. In this regard, over the frame capture time period, the illuminator(s) (e.g., including illuminator 204) alternately emits different light patterns and refrains from emitting light.

As noted above, the ellipsis 390 indicates that any number of ambient exposure operations and pattern exposure operations may be performed over the frame capture time period 304. As will be described in more detail hereafter, the results of the ambient exposure operations may be combined to form an ambient image, and the results of the different pattern exposure operations may be combined to form different pattern images. To provide desirable images, in some instances, at least two pattern exposure operations for each light pattern used are performed over a frame capture time period 304. Furthermore, in some instances, systems refrain from pausing performance of the shutter operations 306 within the frame capture time period 304 in order to avoid motion artifacts. For example, systems may refrain from pausing performance of the shutter operations to perform readout operations (although, under some configurations, readout operations may be performed passively during the frame capture time period 304 without pausing performance of the shutter operations).

Figure 3B:
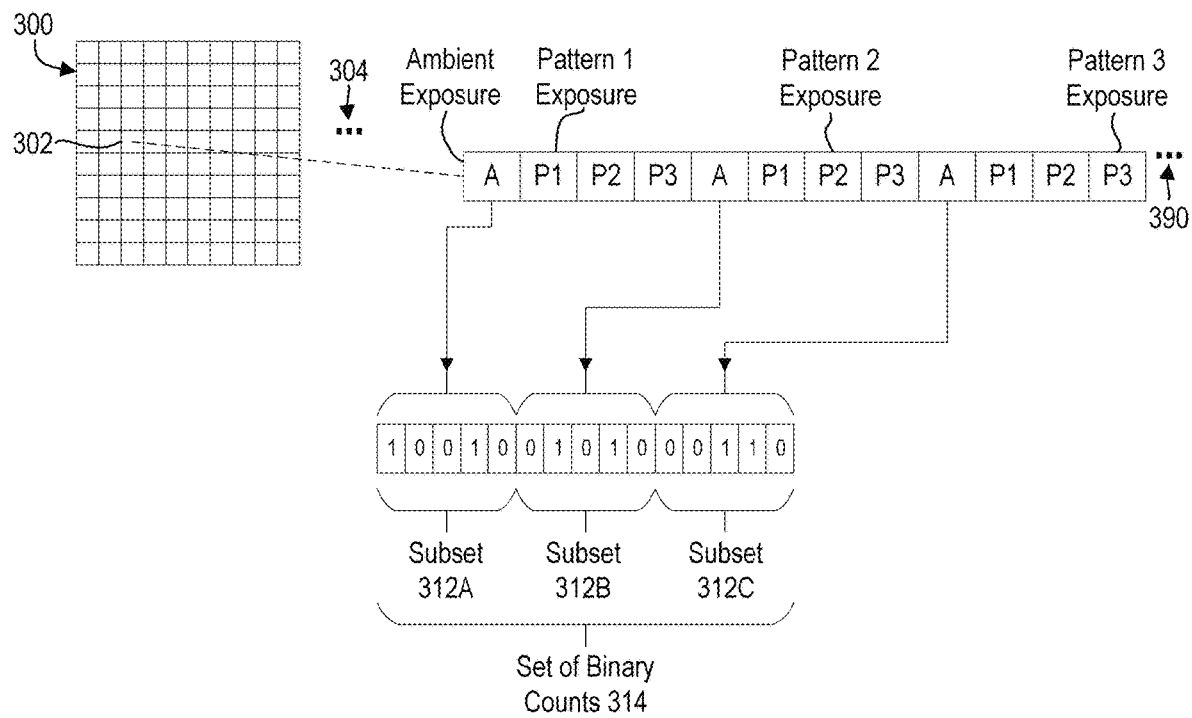

The shutter operations 306 performed during each separate ambient exposure operation (i.e., without emission of light by the illuminator(s)) may provide a separate subset of binary counts. For example, FIG. 3B illustrates various subsets 312A, 312B, and 312C of binary counts. Each subset 312A, 312B, and 312C of binary counts is associated with a different respective ambient exposure operation (illustrated in FIG. 3B by the arrows extending from the various ambient exposure operations to the various subsets 312A, 312B, and 312C of binary counts). As indicated above, and as depicted in FIG. 3B, the various subsets 312A, 312B, and 312C of binary counts are not generated temporally contiguous to one another (i.e., because the pattern exposure operations intervene between the ambient exposure operations). The various subsets 312A, 312B, and 312C of binary counts may be combined to form a set of binary counts 314, and the set of binary counts 314 may be used to generate an ambient image, even though the various subsets 312A, 312B, and 312C of binary counts that form the set of binary counts 314 are not temporally contiguous (see FIG. 3F).

Figure 3C:
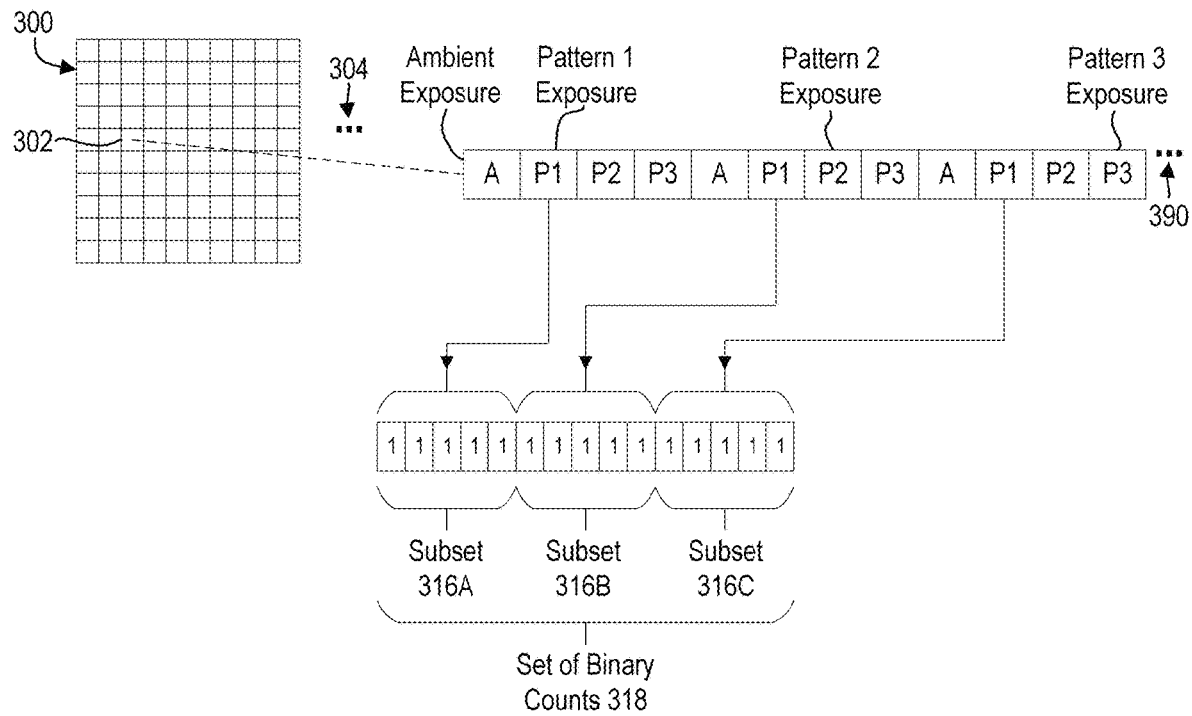

Similarly, the shutter operations 306 performed during each separate P1 exposure operation (i.e., during emission of pattern 1 by the illuminator(s)) may provide a separate subset of binary counts. For example, FIG. 3C illustrates various subsets 316A, 316B, and 316C of binary counts. Each subset 316A, 316B, and 316C of binary counts is associated with a different respective P1 exposure operation (illustrated in FIG. 3C by the arrows extending from the various P1 exposure operations to the various subsets 316A, 316B, and 316C of binary counts). As indicated above, and as depicted in FIG. 3C, the various subsets 316A, 316B, and 316C of binary counts are not generated temporally contiguous to one another (i.e., because ambient exposure operations, P2 exposure operations, and P3 exposure operations intervene between the P1 exposure operations). The various subsets 316A, 316B, and 316C of binary counts may be combined to form a set of binary counts 318, and the set of binary counts 318 may be used for generating a pattern 1 image, even though the various subsets 316A, 316B, and 316C of binary counts that form the set of binary counts 318 are not temporally contiguous (see FIG. 3F).

Figure 3D:
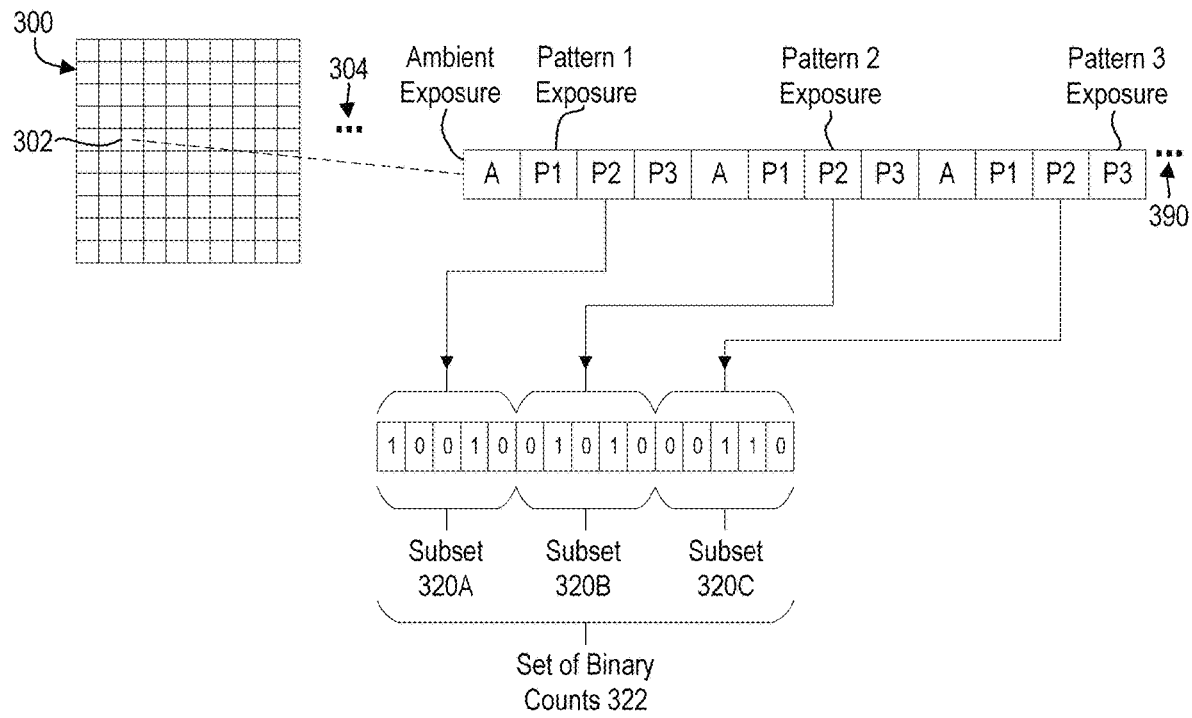

Also, the shutter operations 306 performed during each separate P2 exposure operation (i.e., during emission of pattern 2 by the illuminator(s)) may provide a separate subset of binary counts. For example, FIG. 3D illustrates various subsets 320A, 320B, and 320C of binary counts. Each subset 320A, 320B, and 320C of binary counts is associated with a different respective P2 exposure operation (illustrated in FIG. 3D by the arrows extending from the various P2 exposure operations to the various subsets 320A, 320B, and 320C of binary counts). As indicated above, and as depicted in FIG. 3D, the various subsets 320A, 320B, and 320C of binary counts are not generated temporally contiguous to one another (i.e., because ambient exposure operations, P1 exposure operations, and P3 exposure operations intervene between the P2 exposure operations). The various subsets 320A, 320B, and 320C of binary counts may be combined to form a set of binary counts 322, and the set of binary counts 322 may be used for generating a pattern 2 image, even though the various subsets 320A, 320B, and 320C of binary counts that form the set of binary counts 322 are not temporally contiguous (see FIG. 3F).

Figure 3E:
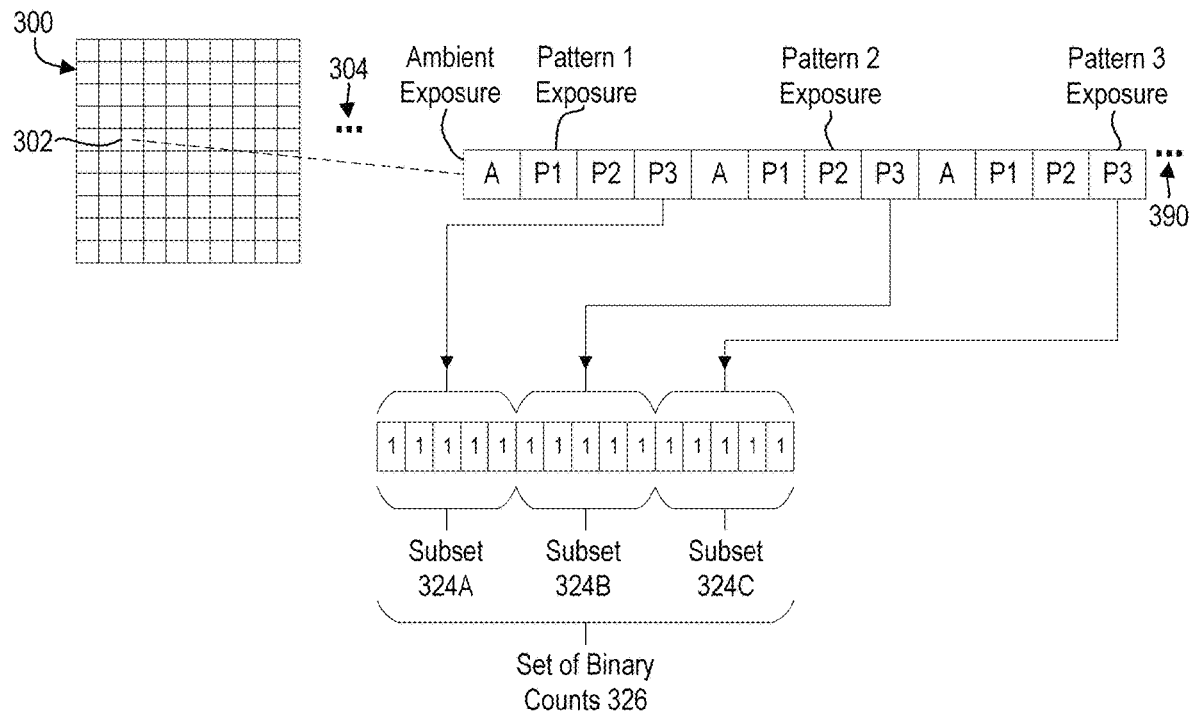

In addition, the shutter operations 306 performed during each separate P3 exposure operation (i.e., during emission of pattern 3 by the illuminator(s)) may provide a separate subset of binary counts. For example, FIG. 3E illustrates various subsets 324A, 324B, and 324C of binary counts. Each subset 324A, 324B, and 324C of binary counts is associated with a different respective P3 exposure operation (illustrated in FIG. 3E by the arrows extending from the various P3 exposure operations to the various subsets 324A, 324B, and 324C of binary counts). As indicated above, and as depicted in FIG. 3E, the various subsets 324A, 324B, and 324C of binary counts are not generated temporally contiguous to one another (i.e., because ambient exposure operations, P1 exposure operations, and P2 exposure operations intervene between the P3 exposure operations). The various subsets 324A, 324B, and 324C of binary counts may be combined to form a set of binary counts 326, and the set of binary counts 326 may be used for generating a pattern 3 image, even though the various subsets 324A, 324B, and 324C of binary counts that form the set of binary counts 318 are not temporally contiguous (see FIG. 3F).

Although FIG. 3B only illustrates a single set of binary counts 314 obtained from shutter operations 306 performed by a single SPAD pixel 302 during ambient exposure operations over the frame capture time period 304, separate sets of binary counts from ambient exposure operations may be generated for each SPAD pixel of the SPAD array 300. Similarly, although FIG. 3C only illustrates a single set of binary counts 318 obtained from shutter operations 306 performed by a single SPAD pixel 302 during P1 exposure operations over the frame capture time period 304, separate sets of binary counts from P1 exposure operations may be generated for each SPAD pixel of the SPAD array 300. Also, although FIG. 3D only illustrates a single set of binary counts 322 obtained from shutter operations 306 performed by a single SPAD pixel 302 during P2 exposure operations over the frame capture time period 304, separate sets of binary counts from P2 exposure operations may be generated for each SPAD pixel of the SPAD array 300. In addition, although FIG. 3E only illustrates a single set of binary counts 326 obtained from shutter operations 306 performed by a single SPAD pixel 302 during P3 exposure operations over the frame capture time period 304, separate sets of binary counts from P3 exposure operations may be generated for each SPAD pixel of the SPAD array 300.

Figure 3F:
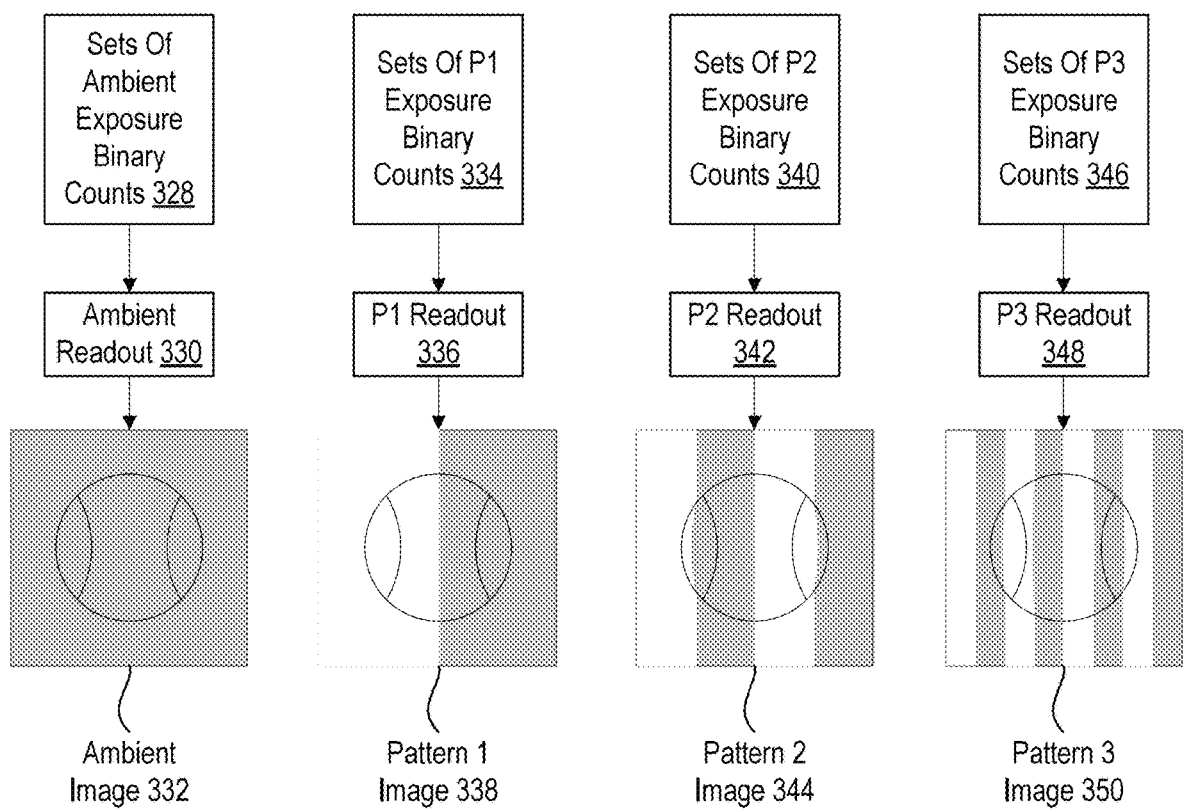
FIG. 3F illustrates example images generated from binary counts obtained via shutter operations performed over the frame capture time period.

FIG. 3F illustrates sets of ambient exposure binary counts 328, which includes each set of binary counts generated by each SPAD pixel of the SPAD array 300 during ambient exposure operations (see FIG. 3B). Each set of binary counts of the sets of ambient exposure binary counts 328 (e.g., including set of binary counts 314 from FIG. 3B) includes a respective plurality of subsets of binary counts (e.g., subsets 312A-312C for set of binary counts 314) generated by a SPAD pixel (e.g., SPAD pixel 302) during the ambient exposure operations over the frame capture time period 304.

FIG. 3F also illustrates ambient readout 330 performed using the sets of ambient exposure binary counts 328. For a SPAD array, a "readout" comprises determining or outputting a number of photons detected over a set of shutter operations on a per-pixel basis. Pixels capturing brighter portions of a captured environment will have counted a greater number of photons than pixels capturing darker portions of the captured environment. The per-pixel number of photons detected over the set of shutter operations may therefore be used to form an intensity image.

Accordingly, ambient readout 330 may comprise determining or outputting the number of photons represented by each set of binary counts of the sets of ambient exposure binary counts 328, where each set corresponds to a different SPAD pixel. Per-pixel intensity values may be determined based on the number of photons from each set, and the per-pixel intensity values may be used to generate the ambient image 332.

Similarly, FIG. 3F illustrates sets of P1 exposure binary counts 334, which includes each set of binary counts generated by each SPAD pixel of the SPAD array 300 during P1 exposure operations (see FIG. 3C). Each set of binary counts of the sets of P1 exposure binary counts 334 (e.g., including set of binary counts 318 from FIG. 3C) includes a respective plurality of subsets of binary counts (e.g., subsets 316A-316C for set of binary counts 318) generated by a SPAD pixel (e.g., SPAD pixel 302) during the P1 exposure operations over the frame capture time period 304.

FIG. 3F also illustrates P1 readout 336 performed using the sets of P1 exposure binary counts 334. P1 readout 328 may comprise determining or outputting the number of photons represented by each set of binary counts of the sets of P1 exposure binary counts 334, where each set corresponds to a different SPAD pixel. Per-pixel intensity values may be determined based on the number of photons from each set, and the per-pixel intensity values may be used to generate the pattern 1 image 338.

Furthermore, FIG. 3F illustrates sets of P2 exposure binary counts 340, which includes each set of binary counts generated by each SPAD pixel of the SPAD array 300 during P2 exposure operations (see FIG. 3D). Each set of binary counts of the sets of P2 exposure binary counts 340 (e.g., including set of binary counts 322 from FIG. 3D) includes a respective plurality of subsets of binary counts (e.g., subsets 320A-320C for set of binary counts 322) generated by a SPAD pixel (e.g., SPAD pixel 302) during the P2 exposure operations over the frame capture time period 304.

FIG. 3F also illustrates P2 readout 342 performed using the sets of P2 exposure binary counts 340. P2 readout 342 may comprise determining or outputting the number of photons represented by each set of binary counts of the sets of P2 exposure binary counts 340, where each set corresponds to a different SPAD pixel. Per-pixel intensity values may be determined based on the number of photons from each set, and the per-pixel intensity values may be used to generate the pattern 2 image 344.

Also, FIG. 3F illustrates sets of P3 exposure binary counts 346, which includes each set of binary counts generated by each SPAD pixel of the SPAD array 300 during P3 exposure operations (see FIG. 3E). Each set of binary counts of the sets of P3 exposure binary counts 346 (e.g., including set of binary counts 326 from FIG. 3E) includes a respective plurality of subsets of binary counts (e.g., subsets 324A-324C for set of binary counts 326) generated by a SPAD pixel (e.g., SPAD pixel 302) during the P3 exposure operations over the frame capture time period 304.

FIG. 3F also illustrates P3 readout 348 performed using the sets of P3 exposure binary counts 346. P3 readout 348 may comprise determining or outputting the number of photons represented by each set of binary counts of the sets of P3 exposure binary counts 348, where each set corresponds to a different SPAD pixel. Per-pixel intensity values may be determined based on the number of photons from each set, and the per-pixel intensity values may be used to generate the pattern 3 image 350.

FIG. 3F illustrates ambient image 332 including a representation of a moving ball captured by the SPAD array 300. FIG. 3F also illustrates the pattern 1 image 338, the pattern 2 image 344, and the pattern 3 image 350 as each including a respective representation of the same moving ball captured by the SPAD array 300 under their respective illumination conditions.

Because the ambient exposure operations used to generate the ambient image 332 are interleaved over the same frame capture time period 304 with the pattern illumination operations used to generate the pattern 1 image 338, the pattern 2 image 344, and the pattern 3 image 350, the moving ball is depicted in the ambient image 324, the pattern 1 image 338, the pattern 2 image 344, and the pattern 3 image 350 in a spatially aligned manner. Stated differently, the motion of the ball will affect the capturing of the ambient image 324, the pattern 1 image 338, the pattern 2 image 344, and the pattern 3 image 350 in substantially the same way.

Figure 4A:
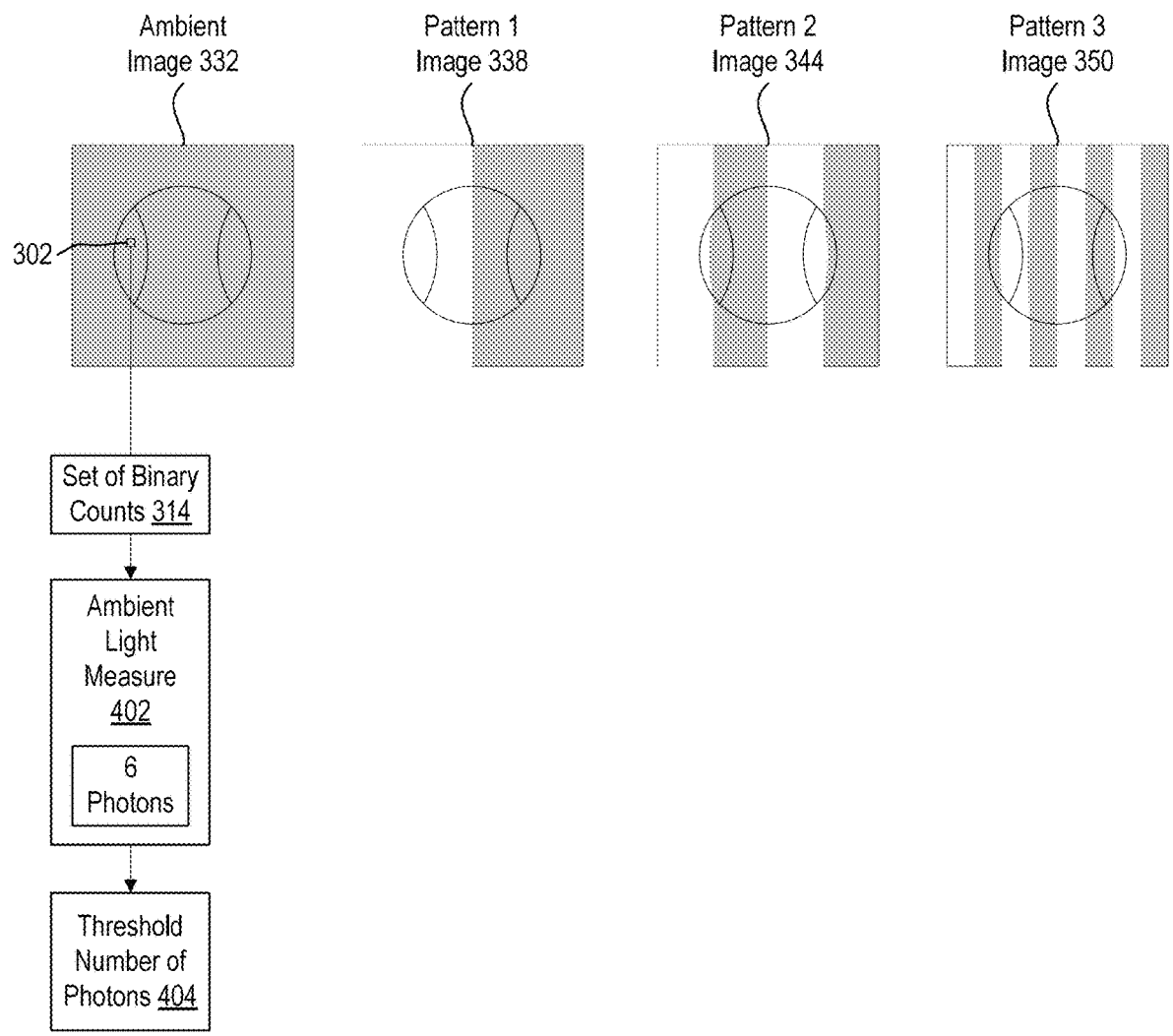
FIGS. 4A-4C and 5A-5B illustrate examples of determining a pixel signature associated with a SPAD pixel.

Because the representations of the moving ball are substantially spatially aligned in the pattern 1 image 338, the pattern 2 image 344, and the pattern 3 image 350, these images may be well-suited for determining pixel signatures for facilitating depth calculations. FIGS. 4A-4C and 5A-5B illustrate examples of determining a pixel signature associated with a SPAD pixel. In particular, FIG. 4A illustrates the ambient image 322, the pattern 1 image 338, the pattern 2 image 344, and the pattern 3 image 350. FIG. 4A depicts an image pixel of the ambient image 332 corresponding to SPAD pixel 302 discussed hereinabove with reference to FIGS. 3A-3E (labeled in FIG. 4A as "302"). The following discussion describes how a pixel signature may be obtained for the SPAD pixel 302 (or the image pixel corresponding thereto).

FIG. 4A illustrates the set of binary counts 314 generated based on shutter operations 306 of the SPAD pixel 302 during ambient exposure operations (see as described hereinabove with reference to FIG. 3B). FIG. 4A furthermore illustrates an ambient light measure 402 determined based on the set of binary counts 314. The ambient light measure 402 comprises a representation of number of detected photons represented in the set of binary counts 314. In the present example, the set of binary counts 314 indicates that 6 photons were detected at the SPAD pixel 302 during the ambient exposure operations, providing an ambient light measure 402 of 6 photons (as illustrated in FIG. 4A).

As is shown in FIG. 4A, the ambient light measure 402 may be used to determine a threshold number of photons 404. The threshold number of photons 404 indicates, in some instances, a cutoff number of photons that is usable to determine whether, while capturing the different pattern images, the SPAD pixel 302 captured a portion of a scene that was illuminated by a structured light pattern. In some instances, the threshold number of photons 402 is greater than the ambient light measure 402.

As will be described hereinbelow, the threshold number of photons 404 may be used to determine signature values for the SPAD pixel 302 associated with the capturing of each of the pattern images (i.e., the pattern 1 image 338, the pattern 2 image 344, and the pattern 3 image 350), and the pixel signature for the SPAD pixel 302 may be based on the signature values.

Figure 4B:
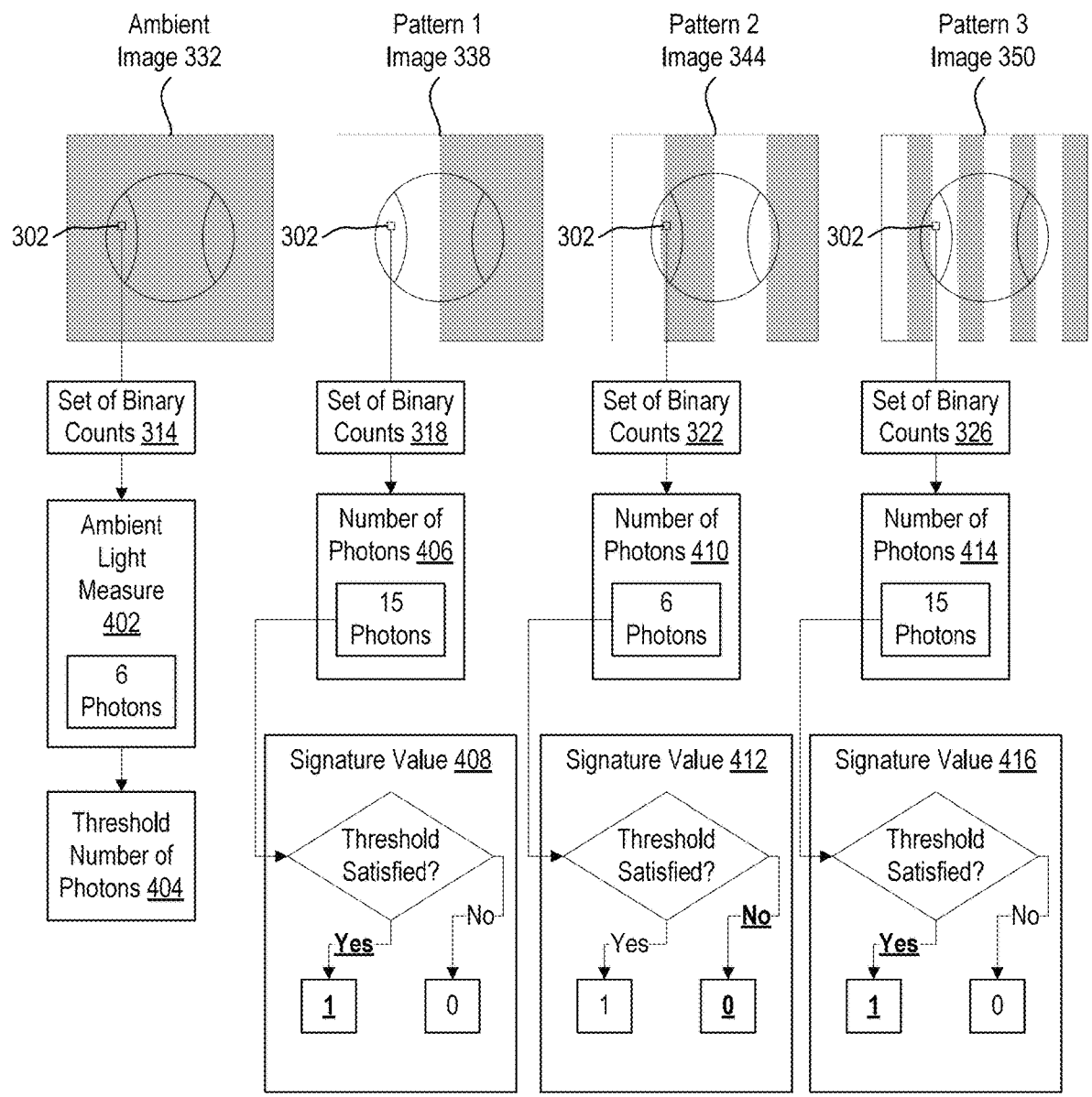

FIG. 4B illustrates the pattern 1 image 338, the pattern 2 image 344, and the pattern 3 image 350, as well as a representation of the SPAD pixel 302 on each pattern image to visually depict the portion of the various pattern images captured by the SPAD pixel 302. FIG. 4B includes the set of binary counts 318 captured by the SPAD pixel 302 during the P1 exposure operations for generating the pattern 1 image 338. FIG. 4B furthermore illustrates a number of photons 406 determined based on the set of binary counts 318 (i.e., 15 photons) and shows a signature value 408 determined based on whether the number of photons 406 satisfies the threshold number of photons 404 discussed above.

As depicted in FIG. 4B, an arrow extends from the number of photons 406 to a decision block within the signature value 408. In the example shown in FIG. 4B, if the number of photons 406 satisfies the threshold number of photons 404, the signature value 408 is defined as a value of "1," and if the number of photons 406 fails to satisfy the threshold number of photons 404, the signature value 408 is defined as a value of "0." FIG. 4B illustrates an example in which, during the P1 exposure operations performed over the frame capture time period 304 to generate the pattern 1 image 338, the SPAD pixel 302 captured a portion of the environment that was illuminated by pattern 1 as projected by an illuminator (see pattern 1 image 338 in FIG. 4B). Accordingly, FIG. 4B illustrates the number of photons 406 represented by the set of binary counts 318 as 15 photons, which far exceeds the ambient light measure 402 and therefore, in this example, satisfies the threshold number of photons 404. Accordingly, FIG. 4B shows the "Yes" and "1"

elements within the signature value 408 in bold and underlined format, indicating that the number of photons 406 satisfies the threshold number of photons 404, resulting in a signature value 408 of "1" for the pattern 1 portion of the SPAD pixel 302.

FIG. 4B similarly shows the set of binary counts 322 captured by the SPAD pixel 302 during the P2 exposure operations for generating the pattern 2 image 344. FIG. 4B furthermore illustrates a number of photons 410 determined based on the set of binary counts 322 (i.e., 6 photons) and shows a signature value 412 determined based on whether the number of photons 410 satisfies the threshold number of photons 404 discussed above. As shown in FIG. 4B, the number of photons 410 represented by the set of binary counts 322 is 6 photons, which fails to exceed the ambient light measure 402 and therefore, in this example, fails to exceed the threshold number of photons 404. Accordingly, FIG. 4B shows the "No" and "0" elements within the signature value 412 in bold and underlined format, indicating that the number of photons 412 fails to satisfy the threshold number of photons 404, resulting in a signature value 412 of "0" for the pattern 2 portion of the SPAD pixel 302.

Furthermore, FIG. 4B illustrates the set of binary counts 326 captured by the SPAD pixel 302 during the P3 exposure operations for generating the pattern 3 image 350. FIG. 4B furthermore illustrates a number of photons 414 determined based on the set of binary counts 326 (i.e., 15 photons) and shows a signature value 416 determined based on whether the number of photons 414 satisfies the threshold number of photons 404 discussed above. As shown in FIG. 4B, the number of photons 414 represented by the set of binary counts 326 is 15 photons, which far exceeds the ambient light measure 402 and therefore, in this example, satisfies the threshold number of photons 404. Accordingly, FIG. 4B shows the "Yes" and "1" elements within the signature value 416 in bold and underlined format, indicating that the number of photons 416 satisfies the threshold number of photons 404, resulting in a signature value 416 of "1" for the pattern 3 portion of the SPAD pixel 302.

Although the foregoing examples utilize measured numbers of photons to determine signature values, other metrics based on sets of binary counts may be used (e.g., average numbers of photons).

Figure 4C:
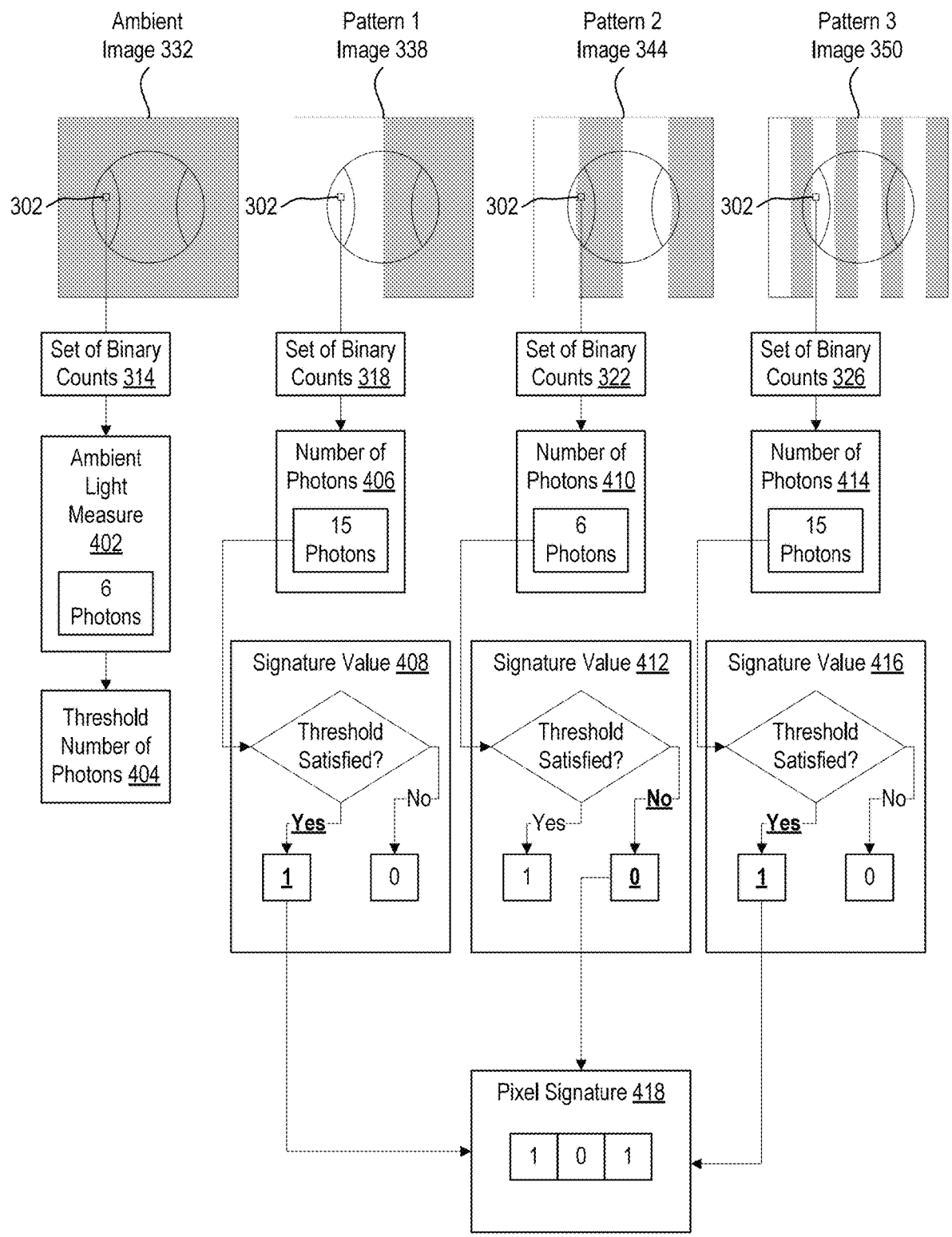

The signature values 408, 412, and 416 may be combined to form a pixel signature associated with the SPAD pixel 302. Because the signatures values 408, 412, and 416 are determined based on the sets of binary counts 318, 322, and 326, respectively, the pixel signature is also based on the binary counts 318, 322, and 326. FIG. 4C illustrates a pixel signature 418 formed from the signature values 408, 412, and 416 by using a sequence of the signature values 408, 412, and 416 as an identifier. One will appreciate, in view of the present disclosure, that a pixel signature may take on other forms and that the signature values (which may also take on other forms) may be combined and/or transformed in various ways to generate the pixel signature.

It will be appreciated, in view of the present disclosure, that pixel signatures may be determined for any number of SPAD pixels (or image pixels associated with the SPAD pixels). FIGS. 4A-4C focus, in at least some respects, on techniques for generating pixel signatures that utilize per-pixel threshold numbers of photons determined based on the ambient image 332 (e.g., based on per-pixel ambient light measures 402). However, other techniques may be used to generate pixel signatures.

Figure 5A:
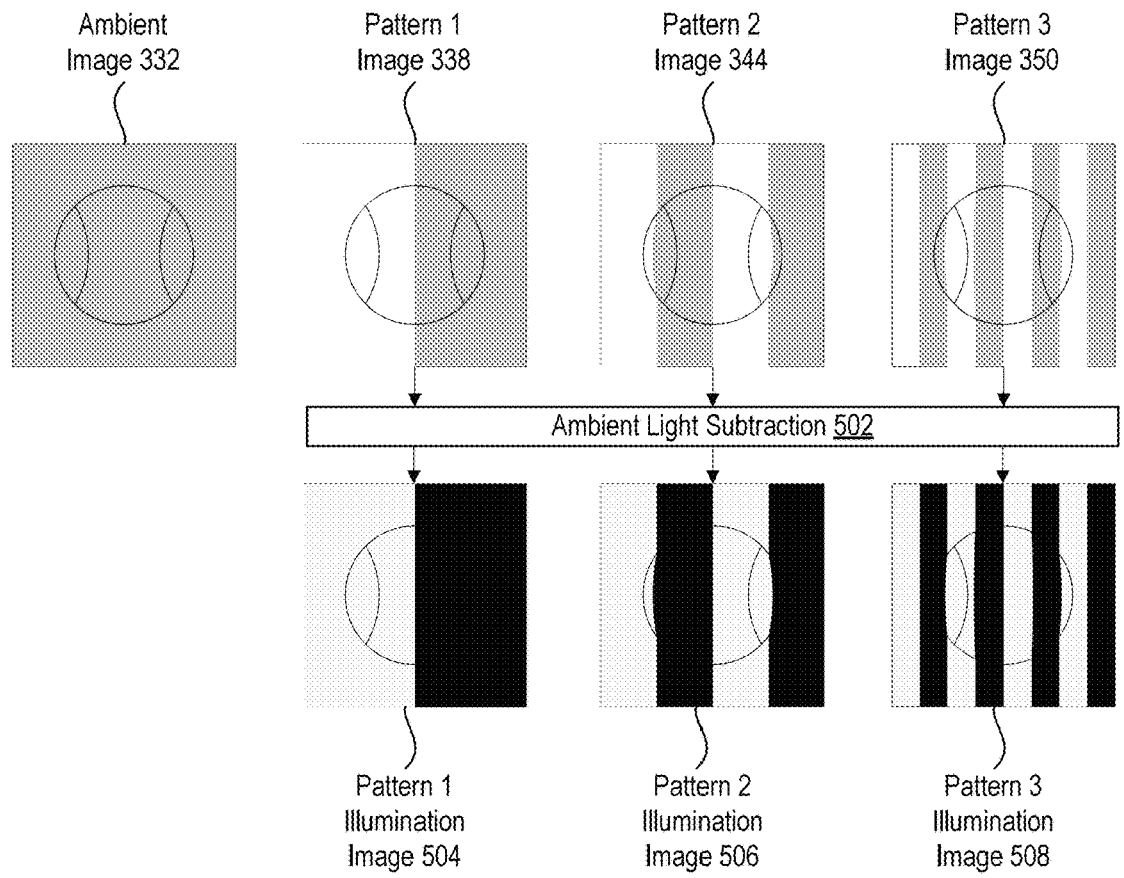

An additional technique for generating pixel signatures is discussed hereinbelow with reference to FIGS. 5A and 5B. FIG. 5A illustrates the ambient image 332, the pattern 1 image 338, the pattern 2 image 344, and the pattern 3 image 350. Rather than determining per-pixel threshold numbers of photons, FIG. 5A illustrates performing ambient light subtraction 502 on the pattern 1 image 338, the pattern 2 image 344, and the pattern 3 image 350. The ambient light subtraction 502 may comprise subtracting the intensity values, ambient light measures, or binary counts associated with the ambient image 332 from each of the pattern 1 image 338, the pattern 2 image 344, and the pattern 3 image 350 on a per-pixel basis. In the example shown in FIG. 5A, the ambient light subtraction operation 502 provides pattern 1 illumination image 504, pattern 2 illumination image 506, and pattern 3 illumination image 508.

In some instances, by subtracting the ambient light from the pattern images to generate pattern illumination images, one or more common photon thresholds may be used to determine signature values for all SPAD pixels used to capture the images (e.g., a threshold of 1 photon). For example, FIG. 5B illustrates image pixels in pattern 1 illumination image 504, pattern 2 illumination image 506, and pattern 3 illumination image 508 that correspond to the SPAD pixel 302. FIG. 5B also illustrates an illumination value 510 (i.e., 9 photons) for the SPAD pixel 302, which is, in some instances, provided by subtracting an ambient light measure (e.g., ambient light measure 402) from a number of photons (e.g., number of photons 406) associated with the pattern 1 image 338. In the example shown in FIG. 5B, the illumination value 510 for the SPAD pixel 302 is 9 photons, and the signature value 512 for the pattern 1 portion of the SPAD pixel 302 is determined to be a value of "1" based on the illumination value 510 satisfying a photon count threshold that is shared with other SPAD pixels (e.g., a threshold of 1 photon).

Figure 5B:
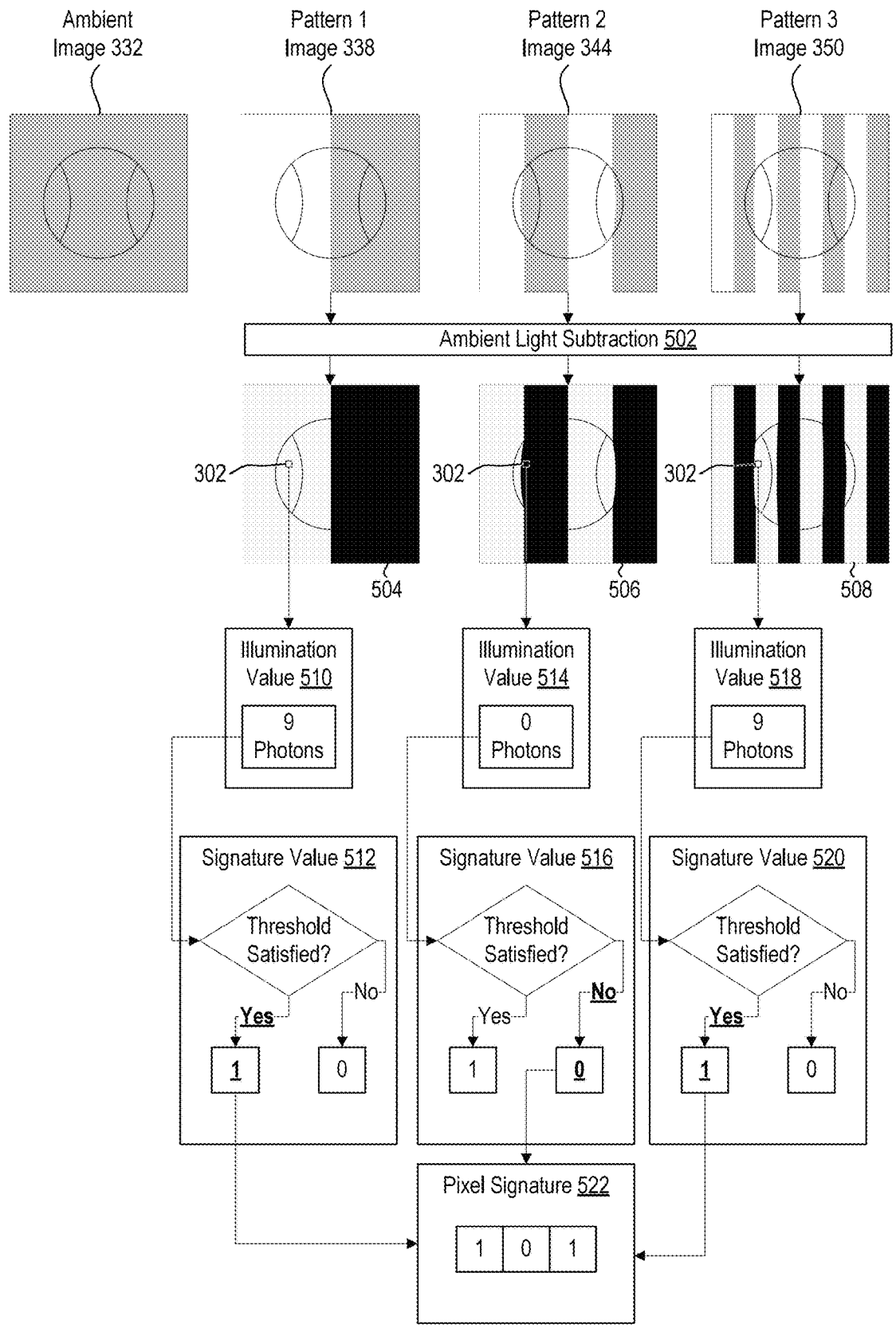

FIG. 5B also illustrates an illumination value 514 for the SPAD pixel 302. In the example shown in FIG. 5B, the illumination value 514 for the SPAD pixel 302 is 0 photons, and the signature value 516 for the pattern 2 portion of the SPAD pixel 302 is determined to be a value of "0" based on the illumination value 514 failing to satisfy a photon count threshold that is shared with other SPAD pixels (e.g., a threshold of 1 photon). Furthermore, FIG. 5B illustrates an illumination value 518 for the SPAD pixel 302. In the example shown in FIG. 5B, the illumination value 518 for the SPAD pixel 302 is 9 photons, and the signature value 520 for the pattern 3 portion of the SPAD pixel 302 is determined to be a value of "1" based on the illumination value 518 satisfying a photon count threshold that is shared with other SPAD pixels (e.g., a threshold of 1 photon). Similar to pixel signature 418 discussed above, pixel signature 522 may be determined based on the signature values 512, 516, and 520.

The present examples focus on using three light patterns to generate pixel signatures. It will be appreciated, in view of the present disclosure, that any number of light patterns may be used to facilitate unique pixel signatures for pixels lying along the same scanline.

In some instances, SPAD pixels may be configured to perform any processing described herein on-sensor to provide sensor output that corresponds to pixel signatures, which may facilitate computationally efficient depth processing.

Furthermore, in some instances, parameters associated with capturing sets of binary counts for facilitating depth processing may be dynamically modified to account for the amount of ambient light present in a captured scene, the distance between image sensors and captured objects, and/or other factors. For example, where a captured scene includes high ambient light, additional light may need to be emitted by an illuminator to provide for sufficient differentiation between portions of the scene that are illuminated with pattern light and portions of the scene that are not. Accordingly, in some instances, based on detected ambient light (e.g., determined by capturing an ambient light image), a system may modify a pulse time period for pulsing an illuminator, a number of pulses associated with emitting one or more light patterns, an amount of light (e.g., intensity of light) emitted by an illuminator, a frame capture time period, shutter timing associated with shutter operations (e.g., gate time 308), and/or other parameters.

Figure 6:
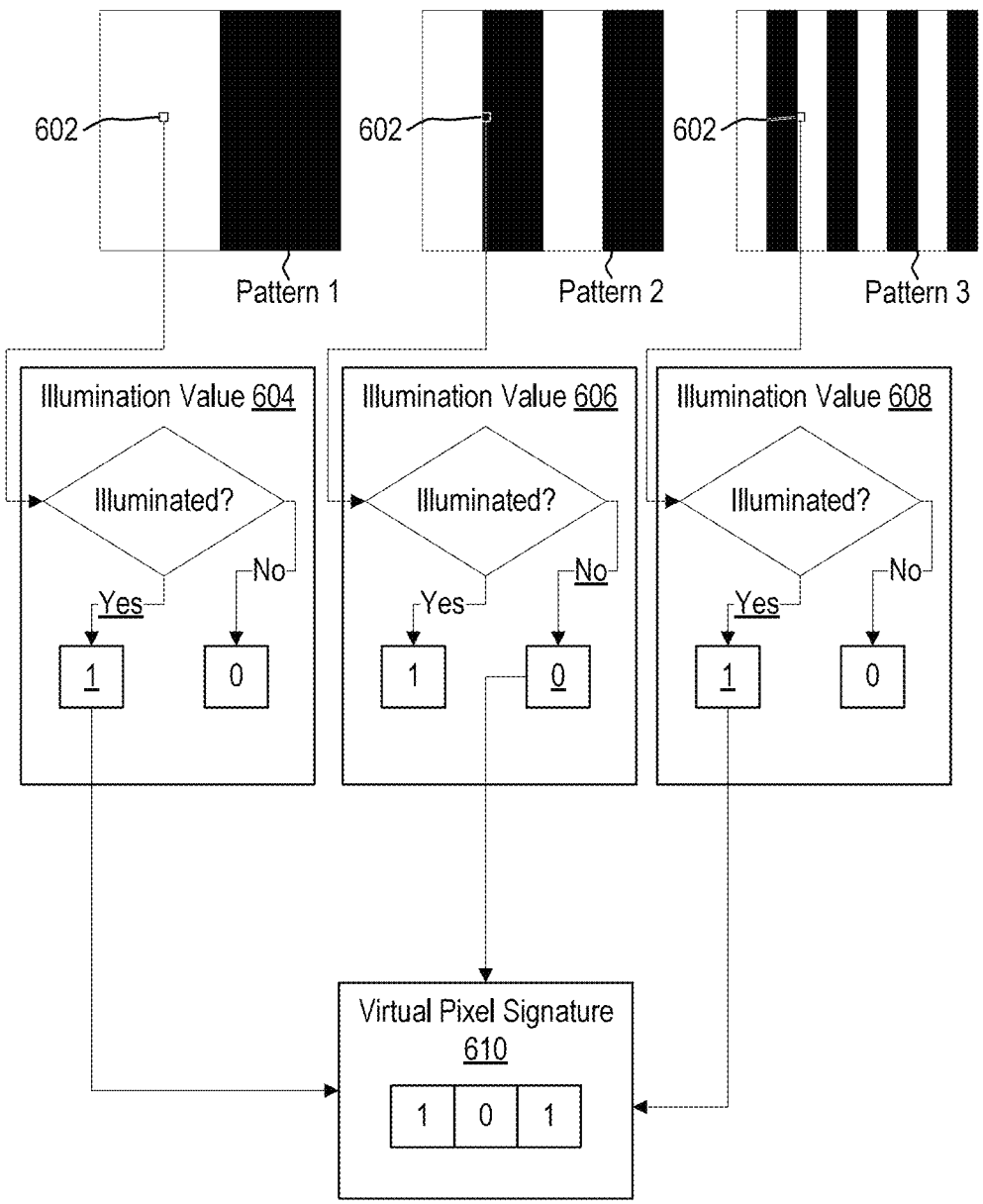
FIG. 6 illustrates an example of determining a virtual pixel signature for a virtual.

As noted hereinabove, an illuminator (e.g., illuminator 204) may be used as a "virtual camera" in conjunction with a SPAD sensor (e.g., SPAD sensor 202) to facilitate structured light depth calculations. FIG. 6 illustrates pattern 1, pattern 2, and pattern 3, which were project into the captured environment to generate pixel signatures 418 and/or 522 according to examples of the present disclosure. FIG. 6 also illustrates a virtual pixel 602 associated with particular pixel coordinates relative to pattern 1, pattern 2, and pattern 3. A system may determine whether the particular pixel coordinates correspond to an illuminated portion or an unilluminated portion for each structured light pattern (e.g., pattern 1, pattern 2, and pattern 3).

Accordingly, FIG. 6 depicts the virtual pixel 602 overlaid on the various patterns (i.e., pattern 1, pattern 2, and pattern 3) and depicts an arrow extending from the virtual pixel 602 to a respective decision block associated with a respective illumination value (i.e., illumination value 604 for pattern 1, illumination value 606 for pattern 2, and illumination value 608 for pattern 3). The decision blocks associated with the illumination values 604, 606, and 608 conceptually depict a determination of whether the coordinates of the virtual pixel 602 correspond to an illuminated or unilluminated portion of the various patterns. As is evident from FIG. 6, the pixel coordinates of the virtual pixel 602 correspond to an illuminated portion of pattern 1, which is represented in the example of FIG. 6 by an illumination value of "1" for the illumination value 604 (with "1" and "Yes" illustrated in bold and underlined format). FIG. 6 also depicts the pixel coordinates of the virtual pixel 602 corresponding to an unilluminated portion of pattern 2, which is represented in the example of FIG. 6 by an illumination value of "0" for the illumination value 606. Furthermore, FIG. 6 illustrates the pixel coordinates of the virtual pixel 602 corresponding to an illuminated portion of pattern 2, which is represented in the example of FIG. 6 by an illumination value of "1" for the illumination value 608.

FIG. 6 illustrates a virtual pixel signature 610 generated based on the illumination values 604-608 discussed above. In the example of FIG. 6, the virtual pixel signature 610 is represented by a sequence of values including "1", "0", and "1", which matches the sequence of values that define the pixel signatures 418 and 522 discussed above for the SPAD pixel 302.

Figure 7:
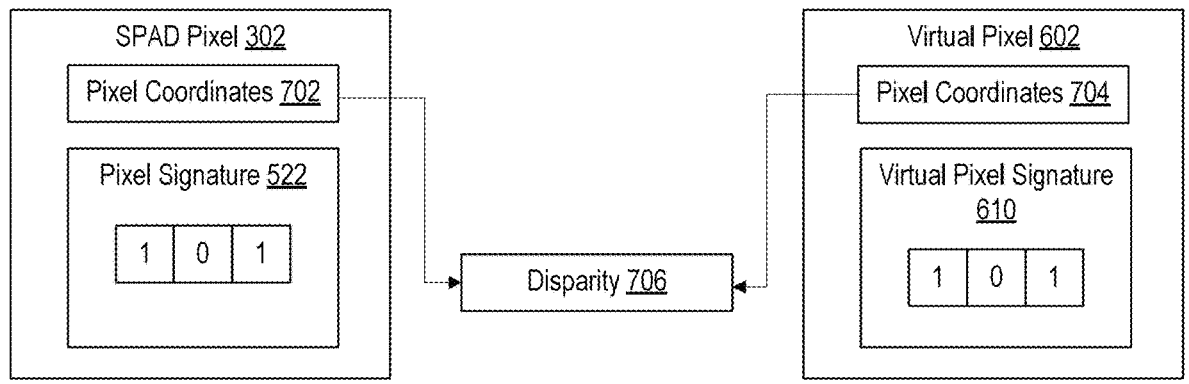
FIG. 7 illustrates an example of generating a disparity value based on a pixel signature and a corresponding virtual pixel signature.

A system may determine a depth value for a SPAD pixel by identifying a corresponding virtual pixel (on a same scanline) that has a virtual pixel signature that matches the pixel signature for the SPAD pixel and using the pixel coordinates of the SPAD pixel and the corresponding virtual pixel to determine a disparity value (which may be used to calculate depth). FIG. 7 conceptually depicts such functionality, illustrating pixel coordinates 702 associated with the SPAD pixel 302 and the pixel signature 522 being used with pixel coordinates 704 associated with the corresponding virtual pixel 602 and the matching virtual pixel signature 610 to determine a disparity value 706. Such functionality may be performed for all SPAD pixels of a SPAD array to determine per-pixel disparity and/or depth values for generating a depth map.

Example Method(s) for Structured Light Depth Computation Using SPADs

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 8:
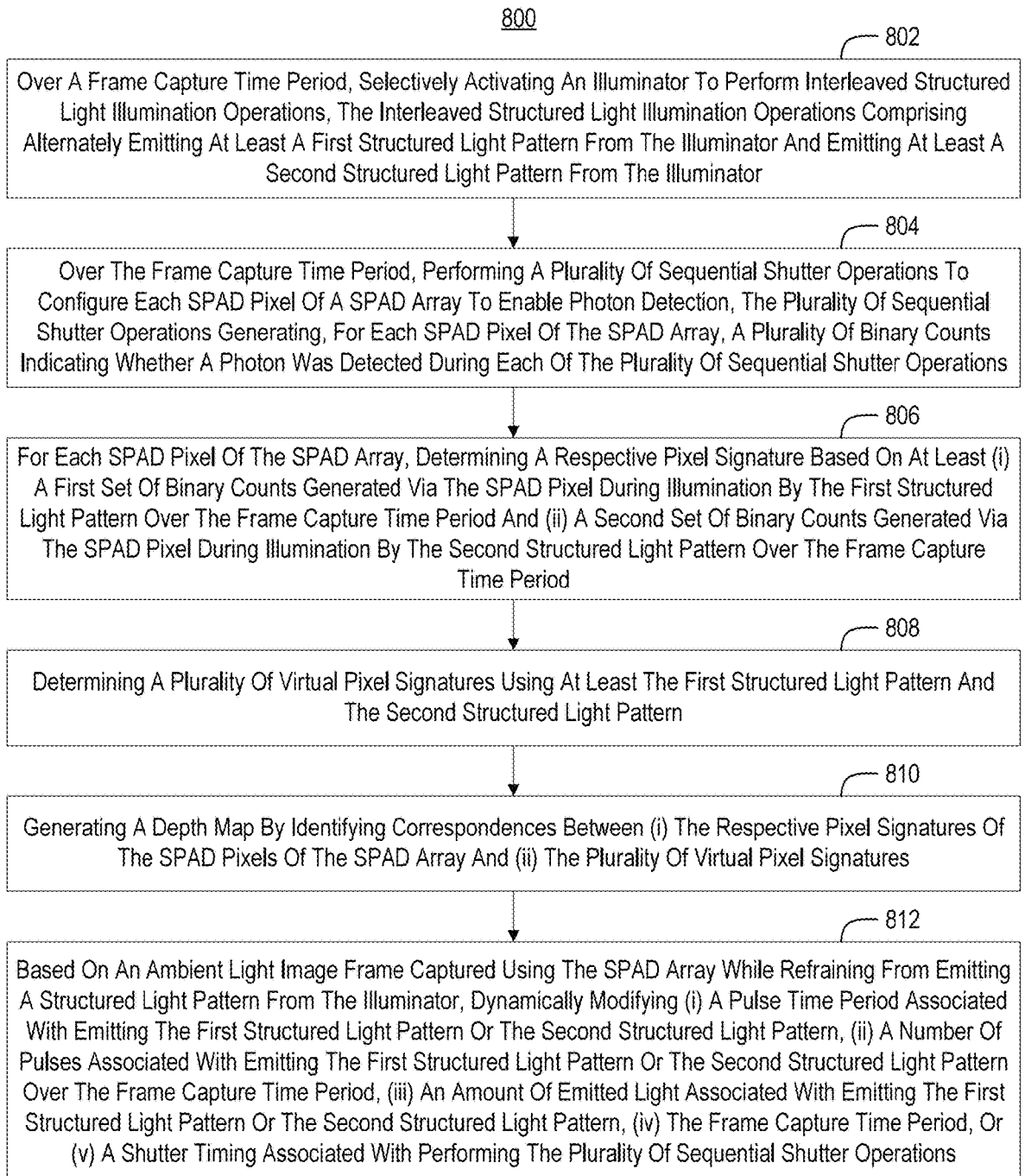
FIG. 8 illustrates an example flow diagram depicting acts associated with structured light depth computation using SPADs.

FIG. 8 illustrates an example flow diagram 800 depicting acts associated with structured light depth computation using SPADs. The discussion of the various acts represented in flow diagram 800 include references to various hardware components described in more detail with reference to FIGS. 1 and/or 2.

Act 802 of flow diagram 800 includes, over a frame capture time period, selectively activating an illuminator to perform interleaved structured light illumination operations, the interleaved structured light illumination operations comprising alternately emitting at least a first structured light pattern from the illuminator and emitting at least a second structured light pattern from the illuminator. Act 802 is performed, in some instances, utilizing one or more components of a system 100 (e.g., processor(s) 102, storage 104, sensor(s) 110, SPAD array(s) 112), I/O system(s) 114, communication system(s) 116), an illuminator (e.g., illuminator 204), and/or other components. In some instances, the first structured light pattern and the second structured light pattern comprise striped structured light patterns. Furthermore, in some instances the second structured light pattern comprises more stripes than the first structured light pattern. Furthermore, in some instances, performing the interleaved structured light illumination operations comprises causing the first structured light pattern and the second structured light pattern to be emitted from the illuminator at least twice over the frame capture time period. Still furthermore, in some instances, performing the plurality of sequential shutter operations comprises refraining from pausing performance of the shutter operations to perform a readout operation during the frame capture time period.

Act 804 of flow diagram 800 includes, over the frame capture time period, performing a plurality of sequential shutter operations to configure each SPAD pixel of a SPAD array to enable photon detection, the plurality of sequential shutter operations generating, for each SPAD pixel of the SPAD array, a plurality of binary counts indicating whether a photon was detected during each of the plurality of sequential shutter operations. Act 804 is performed, in some instances, utilizing one or more components of a system 100 (e.g., processor(s) 102, storage 104, sensor(s) 110, SPAD array(s) 112), I/O system(s) 114, communication system(s) 116) and/or other components.

Act 806 of flow diagram 800 includes, for each SPAD pixel of the SPAD array, determining a respective pixel signature based on at least (i) a first set of binary counts generated via the SPAD pixel during illumination by the first structured light pattern over the frame capture time period and (ii) a second set of binary counts generated via the SPAD pixel during illumination by the second structured light pattern over the frame capture time period. Act 806 is performed, in some instances, utilizing one or more components of a system 100 (e.g., processor(s) 102, storage 104, sensor(s) 110, SPAD array(s) 112), I/O system(s) 114, communication system(s) 116) and/or other components. In some instances, the first set of binary counts comprises a first plurality of subsets of binary counts generated via the SPAD pixel during illumination by the first structured light pattern over the frame capture time period, and each of the first plurality of subsets of binary counts are not generated temporally contiguous to one another. In some instances, the second set of binary counts comprises a second plurality of subsets of binary counts generated via the SPAD pixel during illumination by the second structured light pattern over the frame capture time period, and each of the second plurality of subsets of binary counts are not generated temporally contiguous to one another. Furthermore, in some instances, at least one subset of binary counts of the second plurality of subsets of binary counts temporally intervenes between at least two subsets of binary counts of the first plurality of subsets of binary counts.

In some instances, for each SPAD pixel of the SPAD array, the respective pixel signature is based on at least a respective first signature value and a respective second signature value. In some implementations, the respective first signature value is determined by determining a first illumination value by subtracting a respective ambient light measure from a number of photons represented by the first set of binary counts and determining whether the first illumination value satisfies a threshold number of photons. Furthermore, in some instances, the respective second value is determined by determining a second illumination value by subtracting the respective ambient light measure from a number of photons represented by the second set of binary counts and determining whether the second illumination value satisfies the threshold number of photons.

Still furthermore, in some instances, for each SPAD pixel of the SPAD array, the respective pixel signature is based on at least a respective first signature value and a respective second signature value, the respective first signature value is based on whether a number of photons represented by the first set of binary counts satisfies a respective threshold number of photons, and the respective second signature value being based on whether a number of photons represented by the second set of binary counts. In some implementations, for each SPAD pixel of the SPAD array, the threshold number of photons is determined based on a respective ambient light measure. The respective ambient light measure is determined based on an ambient light image frame captured using the SPAD array while refraining from emitting a structured light pattern from the illuminator. In some instances, the ambient light image frame is generated based on photons detected by SPAD pixels of the SPAD array during the frame capture time period while refraining from emitting a structured light pattern from the illuminator.

Act 808 of flow diagram 800 includes determining a plurality of virtual pixel signatures using at least the first structured light pattern and the second structured light pattern. Act 808 is performed, in some instances, utilizing one or more components of a system 100 (e.g., processor(s) 102, storage 104, sensor(s) 110, SPAD array(s) 112), I/O system(s) 114, communication system(s) 116) and/or other components. In some instances, each virtual pixel signature of the plurality of virtual pixel signatures is associated with respective pixel coordinates relative to the first structured light pattern and the second structured light pattern. Each particular virtual pixel signature of the plurality of virtual pixel signatures may be based on (i) whether the respective pixel coordinates for the particular virtual pixel signature are associated with an illuminated portion or an unilluminated portion of the first structured light pattern and (ii) whether the respective pixel coordinates for the particular virtual pixel signature are associated with an illuminated portion or an unilluminated portion of the second structured light pattern.

Act 810 of flow diagram 800 includes generating a depth map by identifying correspondences between (i) the respective pixel signatures of the SPAD pixels of the SPAD array and (ii) the plurality of virtual pixel signatures. Act 810 is performed, in some instances, utilizing one or more components of a system 100 (e.g., processor(s) 102, storage 104, sensor(s) 110, SPAD array(s) 112), I/O system(s) 114, communication system(s) 116) and/or other components.

Act 812 of flow diagram 800 includes, based on an ambient light image frame captured using the SPAD array while refraining from emitting a structured light pattern from the illuminator, dynamically modifying (i) a pulse time period associated with emitting the first structured light pattern or the second structured light pattern, (ii) a number of pulses associated with emitting the first structured light pattern or the second structured light pattern over the frame capture time period, (iii) an amount of emitted light associated with emitting the first structured light pattern or the second structured light pattern, (iv) the frame capture time period, or (v) a shutter timing associated with performing the plurality of sequential shutter operations. Act 814 is performed, in some instances, utilizing one or more components of a system 100 (e.g., processor(s) 102, storage 104, sensor(s) 110, SPAD array(s) 112), I/O system(s) 114, communication system(s) 116) and/or other components.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for structured light depth computation using single photon avalanche diodes (SPADs), the system comprising:
    a SPAD array comprising a plurality of SPAD pixels;
    an illuminator configured to emit one or more structured light patterns;
    one or more processors; and
    one or more hardware storage devices storing instructions that are executable by the one or more processors to configure the system to:
        over a frame capture time period, selectively activate the illuminator to perform interleaved structured light illumination operations, the interleaved structured light illumination operations comprising alternately emitting at least a first structured light pattern from the illuminator and emitting at least a second structured light pattern from the illuminator;
        over the frame capture time period, perform a plurality of sequential shutter operations to configure the SPAD array to enable photon detection, the plurality of sequential shutter operations generating, for each SPAD pixel of the SPAD array, a plurality of binary counts indicating whether a photon was detected during each of the plurality of sequential shutter operations; and
        for each SPAD pixel of the SPAD array, determine a respective pixel signature based on at least (i) a first set of binary counts generated via the SPAD pixel during illumination by the first structured light pattern over the frame capture time period and (ii) a second set of binary counts generated via the SPAD pixel during illumination by the second structured light pattern over the frame capture time period.

2. The system of claim 1, wherein performing the interleaved structured light illumination operations comprises causing the first structured light pattern and the second structured light pattern to be emitted from the illuminator at least twice over the frame capture time period.

3. The system of claim 1, wherein performing the plurality of sequential shutter operations comprises refraining from pausing performance of the shutter operations to perform a readout operation during the frame capture time period.

4. The system of claim 1, wherein the system comprises a head-mounted display.

5. The system of claim 1, wherein, for each SPAD pixel of the SPAD array:
the first set of binary counts comprises a first plurality of subsets of binary counts generated via the SPAD pixel during illumination by the first structured light pattern over the frame capture time period,
each of the first plurality of subsets of binary counts are not generated temporally contiguous to one another,
the second set of binary counts comprises a second plurality of subsets of binary counts generated via the SPAD pixel during illumination by the second structured light pattern over the frame capture time period, and
each of the second plurality of subsets of binary counts are not generated temporally contiguous to one another.

6. The system of claim 5, wherein at least one subset of binary counts of the second plurality of subsets of binary counts temporally intervenes between at least two subsets of binary counts of the first plurality of subsets of binary counts.

7. The system of claim 1, wherein, for each SPAD pixel of the SPAD array:
the respective pixel signature is based on at least a respective first signature value and a respective second signature value,
the respective first signature value is determined by:
determining a first illumination value by subtracting a respective ambient light measure from a number of photons represented by the first set of binary counts; and
determining whether the first illumination value satisfies a threshold number of photons, and
the respective second value is determined by:
determining a second illumination value by subtracting the respective ambient light measure from a number of photons represented by the second set of binary counts; and
determining whether the second illumination value satisfies the threshold number of photons.

8. The system of claim 1, wherein, for each SPAD pixel of the SPAD array:
the respective pixel signature is based on at least a respective first signature value and a respective second signature value,
the respective first signature value is based on whether a number of photons represented by the first set of binary counts satisfies a respective threshold number of photons, and
the respective second signature value being based on whether a number of photons represented by the second set of binary counts.

9. The system of claim 8, wherein, for each SPAD pixel of the SPAD array, the threshold number of photons is determined based on a respective ambient light measure, the respective ambient light measure being determined based on an ambient light image frame captured using the SPAD array while refraining from emitting a structured light pattern from the illuminator.

10. The system of claim 9, wherein the ambient light image frame is generated based on photons detected by SPAD pixels of the SPAD array during the frame capture time period while refraining from emitting a structured light pattern from the illuminator.

11. The system of claim 1, wherein the instructions are executable by the one or more processors to further configure the system to determine a plurality of virtual pixel signatures using at least the first structured light pattern and the second structured light pattern, each virtual pixel signature of the plurality of virtual pixel signatures being associated with respective pixel coordinates relative to the first structured light pattern and the second structured light pattern, each particular virtual pixel signature of the plurality of virtual pixel signatures being based on (i) whether the respective pixel coordinates for the particular virtual pixel signature are associated with an illuminated portion or an unilluminated portion of the first structured light pattern and (ii) whether the respective pixel coordinates for the particular virtual pixel signature are associated with an illuminated portion or an unilluminated portion of the second structured light pattern.

12. The system of claim 11, wherein the instructions are executable by the one or more processors to further configure the system to generate a depth map by identifying correspondences between (i) the respective pixel signatures of the SPAD pixels of the SPAD array and (ii) the plurality of virtual pixel signatures.

13. The system of claim 1, wherein the instructions are executable by the one or more processors to configure the system to dynamically modify a pulse time period associated with emitting the first structured light pattern or the second structured light pattern based on an ambient light image frame captured using the SPAD array while refraining from emitting a structured light pattern from the illuminator.

14. The system of claim 1, wherein the instructions are executable by the one or more processors to configure the system to dynamically modify a number of pulses associated with emitting the first structured light pattern or the second structured light pattern over the frame capture time period based on an ambient light image frame captured using the SPAD array while refraining from emitting a structured light pattern from the illuminator.

15. The system of claim 1, wherein the instructions are executable by the one or more processors to configure the system to dynamically modify an amount of emitted light associated with emitting the first structured light pattern or the second structured light pattern based on an ambient light image frame captured using the SPAD array while refraining from emitting a structured light pattern from the illuminator.

16. The system of claim 1, wherein the instructions are executable by the one or more processors to configure the system to dynamically modify the frame capture time period based on an ambient light image frame captured using the SPAD array while refraining from emitting a structured light pattern from the illuminator.

17. The system of claim 1, wherein the instructions are executable by the one or more processors to configure the system to dynamically modify a shutter timing associated with performing the plurality of sequential shutter operations based on an ambient light image frame captured using the SPAD array while refraining from emitting a structured light pattern from the illuminator.

18. The system of claim 1, wherein the first structured light pattern and the second structured light pattern comprise striped structured light patterns, and wherein the second structured light pattern comprises more stripes than the first structured light pattern.

19. A system for structured light depth computation, the system comprising:
- an image sensor array comprising a plurality of image sensor pixels;
- an illuminator configured to emit one or more structured light patterns;
- one or more processors; and
- one or more hardware storage devices storing instructions that are executable by the one or more processors to configure the system to:
  - over a frame capture time period, selectively activate the illuminator to perform interleaved structured light illumination operations, the interleaved structured light illumination operations comprising alternately emitting at least a first structured light pattern from the illuminator and emitting at least a second structured light pattern from the illuminator;
  - over the frame capture time period, perform a plurality of sequential shutter operations to configure the image sensor array to enable photon detection, the plurality of sequential shutter operations generating, for each image sensor pixel of the image sensor array, a plurality of binary counts indicating whether a photon was detected during each of the plurality of sequential shutter operations; and
  - for each image sensor pixel of the image sensor array, determine a respective pixel signature based on at least (i) a first set of binary counts generated via the image sensor pixel during illumination by the first structured light pattern over the frame capture time period and (ii) a second set of binary counts generated via the image sensor pixel during illumination by the second structured light pattern over the frame capture time period.

20. A system for structured light depth computation, the system comprising:
- an image sensor array comprising a plurality of image sensor pixels;
- an illuminator configured to emit one or more structured light patterns;
- one or more processors; and
- one or more hardware storage devices storing instructions that are executable by the one or more processors to configure the system to:
  - over a frame capture time period, selectively activate the illuminator to perform interleaved structured light illumination operations, the interleaved structured light illumination operations comprising alternately emitting at least a first structured light pattern from the illuminator and emitting at least a second structured light pattern from the illuminator, wherein performing the interleaved structured light illumination operations comprises causing the first structured light pattern and the second structured light pattern to be emitted from the illuminator at least twice over the frame capture time period and within the same frame capture time period; and
  - over the frame capture time period, perform a plurality of sequential shutter operations to configure the image sensor array to enable photon detection, the plurality of sequential shutter operations generating, for each image sensor pixel of the image sensor array, a plurality of binary counts indicating whether a photon was detected during each of the plurality of sequential shutter operations.

* * * * *